(12) United States Patent
Cai et al.

(10) Patent No.: US 8,170,567 B2
(45) Date of Patent: May 1, 2012

(54) RADIO RESOURCE MANAGEMENT IN WIRELESS CELLULAR NETWORKS HAVING MULTIHOP RELAY STATIONS

(75) Inventors: Sean Cai, San Diego, CA (US); Kim Olszewski, San Diego, CA (US)

(73) Assignee: ZTE (USA) Inc., Iselin, NJ (US)

( * ) Notice: Subject to any disclaimer, the term of this patent is extended or adjusted under 35 U.S.C. 154(b) by 923 days.

(21) Appl. No.: 12/045,695

(22) Filed: Mar. 10, 2008

(65) Prior Publication Data
US 2008/0220790 A1 Sep. 11, 2008

Related U.S. Application Data

(60) Provisional application No. 60/894,186, filed on Mar. 9, 2007.

(51) Int. Cl.
*H04W 24/00* (2009.01)
(52) U.S. Cl. ............... 455/450; 370/437; 370/395.41
(58) Field of Classification Search ............ 455/450; 370/395.41, 437
See application file for complete search history.

(56) References Cited

U.S. PATENT DOCUMENTS

| | | | | |
|---|---|---|---|---|
| 5,737,363 A | * | 4/1998 | Dinkins | 375/219 |
| 2004/0190447 A1 | | 9/2004 | Dacosta | |
| 2004/0266339 A1 | | 12/2004 | Larsson | |
| 2006/0209671 A1 | * | 9/2006 | Khan et al. | 370/208 |
| 2006/0285505 A1 | | 12/2006 | Cho et al. | |
| 2008/0080436 A1 | * | 4/2008 | Sandhu et al. | 370/338 |
| 2008/0107091 A1 | * | 5/2008 | Ramachandran | 370/338 |

FOREIGN PATENT DOCUMENTS

| | | |
|---|---|---|
| EP | 1 447 921 A1 | 8/2004 |
| WO | WO 2005/064872 | 7/2005 |
| WO | 2006/034578 A1 | 4/2006 |

OTHER PUBLICATIONS

IEEE 802.16j, Broadband Wireless Access Working Group, "Multi-hop Relay System Evaluation Methodology (Channel Model and Performance Metric)," Sep. 5, 2006, 38 pages.
IEEE 802.16-2004, "IEEE Standard for Local and Metropolitan Area Networks, Part 16: Air Interface for Fixed Broadband Wireless Access Systems," Oct. 1, 2004, 895 pages.
IEEE 802.16e-2005, "IEEE Standard for Fixed and Mobile Broadband Wireless Access Systems, Part 16: Air Interface for Fixed and Mobile Broadband Wireless Access Systems and Amendment 2: Physical and Medium Access Control Layers for Combined Fixed and Mobile Operation in Licensed Bands and Corrigendum 1," Feb. 18, 2006, 864 pages.
L. E. Miller, "Multihop Connectivity of Arbitrary Networks," Wireless Communication Technologies Group, NIST, Tech Report (Mar. 2001), 4 pages.
European Search Report mailed on Aug. 10, 2010, for European Application No. 08780472.0 (7 pages).
Office Action mailed Jan. 31, 2012, for Japanese Patent Application No. 2009-552933 (5 pages).

(Continued)

*Primary Examiner* — Marcos Batista
(74) *Attorney, Agent, or Firm* — Perkins Coie LLP

(57) ABSTRACT

Radio resource management for wireless cellular networks equipped with relay stations for multi-hop packet or protocol data unit (PDU) relaying.

16 Claims, 20 Drawing Sheets

OTHER PUBLICATIONS

Oyman, Ozgur, et al., "End-to-End Throughput Metrics for QoS Management in 802.16j MR Systems," IEEE Broadband Wireless Access Working Group Contribution, USA, IEEE, Nov. 7, 2006, pp. 0-6, obtained Jan. 24, 2012, from http://WWW.ieee802.org/16/relay/contrib/C80216j-06_202rl.Pdf.

Zhang, Aimin, et. al. "Some Considerations on Mobile Multi-hop Relay Based System," IEEE 802.16 Presentation Submission, USA, IEEE, May 28, 2006, IEEE C802.16j-06/002, 11 pages, obtained on Sep. 1, 2011, from http://grouper.ieee.org/groups/802/16/relay/contrib/C80216j-06_002.pdf.

* cited by examiner

FIG. 1. Wireless Cellular Network with Relay Stations

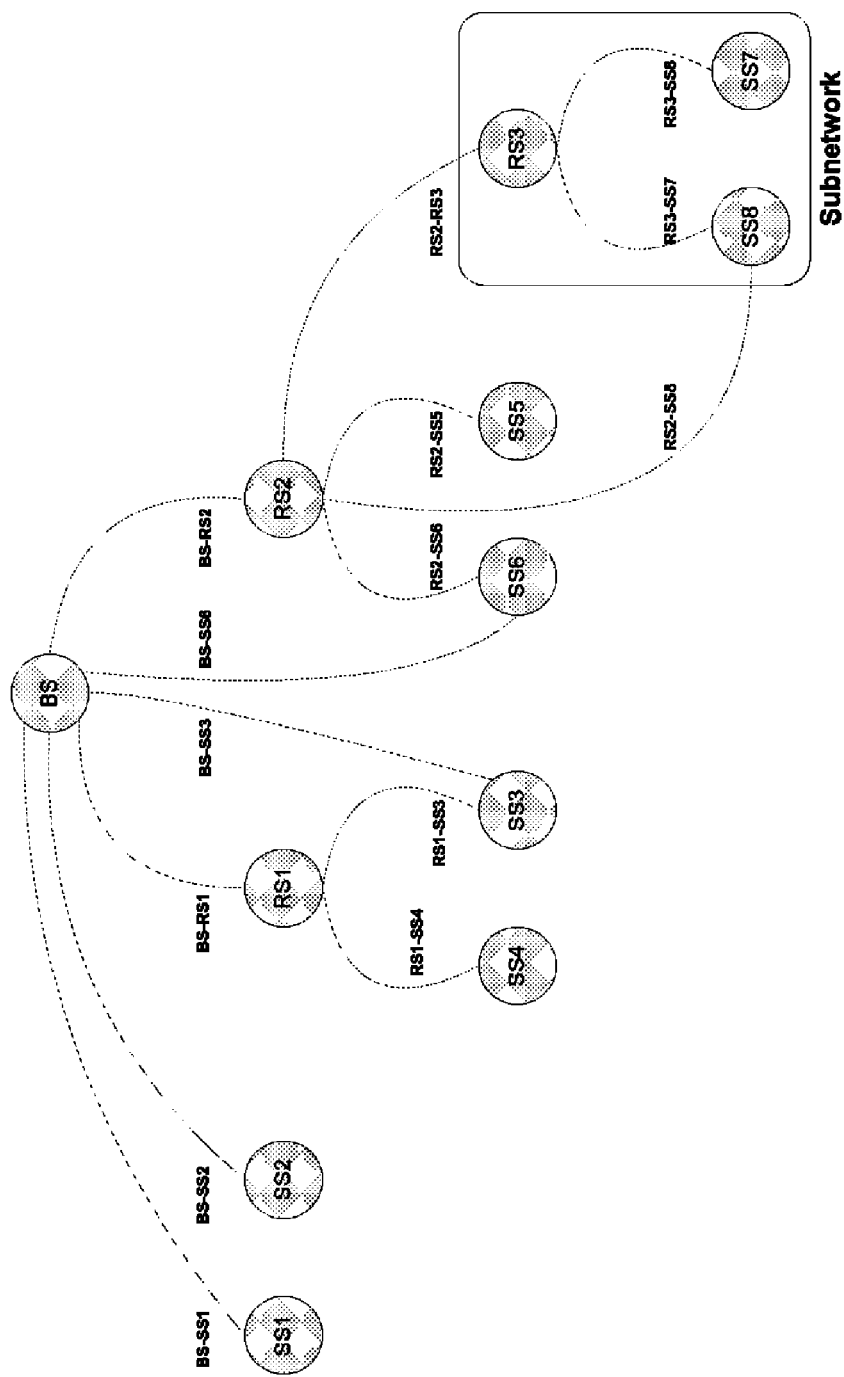
FIG. 3. Graph for FIG. 1 Network

|      | BS | RS1 | RS2 | RS3 | SS1 | SS2 | SS3 | SS4 | SS5 | SS6 | SS7 | SS8 |
|------|----|----|----|----|----|----|----|----|----|----|----|----|
| BS   | 0 | BS-RS1 | BS-RS2 | 0 | BS-SS1 | BS-SS2 | BS-SS3 | 0 | 0 | BS-SS6 | 0 | 0 |
| RS1  | BS-RS1 | 0 | 0 | 0 | 0 | 0 | RS1-SS3 | RS1-SS4 | 0 | 0 | 0 | 0 |
| RS2  | BS-RS2 | 0 | 0 | RS2-RS3 | 0 | 0 | 0 | 0 | RS2-SS5 | RS2-SS6 | 0 | RS2-SS8 |
| RS3  | 0 | 0 | RS2-RS3 | 0 | 0 | 0 | 0 | 0 | 0 | 0 | RS3-SS7 | RS3-SS8 |
| SS1  | BS-SS1 | 0 | 0 | 0 | 0 | 0 | 0 | 0 | 0 | 0 | 0 | 0 |
| SS2  | BS-SS2 | 0 | 0 | 0 | 0 | 0 | 0 | 0 | 0 | 0 | 0 | 0 |
| SS3  | BS-SS3 | RS1-SS3 | 0 | 0 | 0 | 0 | 0 | 0 | 0 | 0 | 0 | 0 |
| SS4  | 0 | RS1-SS4 | 0 | 0 | 0 | 0 | 0 | 0 | 0 | 0 | 0 | 0 |
| SS5  | 0 | 0 | RS2-SS5 | 0 | 0 | 0 | 0 | 0 | 0 | 0 | 0 | 0 |
| SS6  | BS-SS6 | 0 | RS2-SS6 | 0 | 0 | 0 | 0 | 0 | 0 | 0 | 0 | 0 |
| SS7  | 0 | 0 | 0 | RS3-SS7 | 0 | 0 | 0 | 0 | 0 | 0 | 0 | 0 |
| SS8  | 0 | 0 | RS2-SS8 | RS3-SS8 | 0 | 0 | 0 | 0 | 0 | 0 | 0 | 0 |

FIG. 4A. Link Rank Matrix for for FIG. 1 Network

| | BS | RS1 | RS2 | RS3 | SS1 | SS2 | SS3 | SS4 | SS5 | SS6 | SS7 | SS8 |
|---|---|---|---|---|---|---|---|---|---|---|---|---|
| BS  | 0 | 1 | 1 | 0 | 1 | 1 | 1 | 0 | 0 | 1 | 0 | 0 |
| RS1 | 1 | 0 | 0 | 0 | 0 | 0 | 1 | 1 | 0 | 0 | 0 | 0 |
| RS2 | 1 | 0 | 0 | 0 | 0 | 0 | 0 | 0 | 1 | 1 | 0 | 1 |
| RS3 | 0 | 0 | 0 | 0 | 0 | 0 | 0 | 0 | 0 | 1 | 1 | 1 |
| SS1 | 1 | 0 | 0 | 0 | 0 | 0 | 0 | 0 | 0 | 0 | 0 | 0 |
| SS2 | 1 | 0 | 0 | 0 | 0 | 0 | 0 | 0 | 0 | 0 | 0 | 0 |
| SS3 | 1 | 1 | 0 | 0 | 0 | 0 | 0 | 0 | 0 | 0 | 0 | 0 |
| SS4 | 0 | 1 | 0 | 0 | 0 | 0 | 0 | 0 | 0 | 0 | 0 | 0 |
| SS5 | 0 | 0 | 1 | 0 | 0 | 0 | 0 | 0 | 0 | 0 | 0 | 0 |
| SS6 | 1 | 0 | 1 | 1 | 0 | 0 | 0 | 0 | 0 | 0 | 0 | 0 |
| SS7 | 0 | 0 | 0 | 1 | 0 | 0 | 0 | 0 | 0 | 0 | 0 | 0 |
| SS8 | 0 | 0 | 1 | 1 | 0 | 0 | 0 | 0 | 0 | 0 | 0 | 0 |

FIG. 4B. One-hop Connectivity Matrix for FIG. 1 Network

| | BS | RS1 | RS2 | RS3 | SS1 | SS2 | SS3 | SS4 | SS5 | SS6 | SS7 | SS8 |
|---|---|---|---|---|---|---|---|---|---|---|---|---|
| BS  | 0 | 1 | 1 | 2 | 1 | 1 | 1 | 2 | 2 | 1 | 3 | 2 |
| RS1 | 1 | 0 | 2 | 3 | 2 | 2 | 2 | 3 | 3 | 2 | 4 | 3 |
| RS2 | 1 | 2 | 0 | 1 | 2 | 2 | 2 | 3 | 1 | 2 | 2 | 3 |
| RS3 | 2 | 3 | 1 | 0 | 3 | 3 | 3 | 4 | 2 | 1 | 1 | 1 |
| SS1 | 1 | 2 | 2 | 3 | 0 | 2 | 2 | 1 | 3 | 1 | 2 | 1 |
| SS2 | 1 | 2 | 2 | 3 | 2 | 0 | 2 | 3 | 2 | 2 | 1 | 1 |
| SS3 | 1 | 2 | 2 | 3 | 2 | 2 | 0 | 2 | 3 | 2 | 4 | 3 |
| SS4 | 2 | 3 | 3 | 4 | 3 | 3 | 2 | 0 | 3 | 2 | 4 | 3 |
| SS5 | 2 | 3 | 1 | 2 | 3 | 2 | 3 | 4 | 0 | 3 | 5 | 4 |
| SS6 | 1 | 2 | 2 | 1 | 2 | 2 | 2 | 3 | 2 | 0 | 3 | 2 |
| SS7 | 3 | 4 | 2 | 1 | 4 | 4 | 4 | 5 | 3 | 3 | 0 | 2 |
| SS8 | 2 | 3 | 1 | 1 | 3 | 3 | 3 | 4 | 2 | 2 | 2 | 0 |

FIG. 4C. 5-hop Connectivity Matrix for FIG. 1 Network

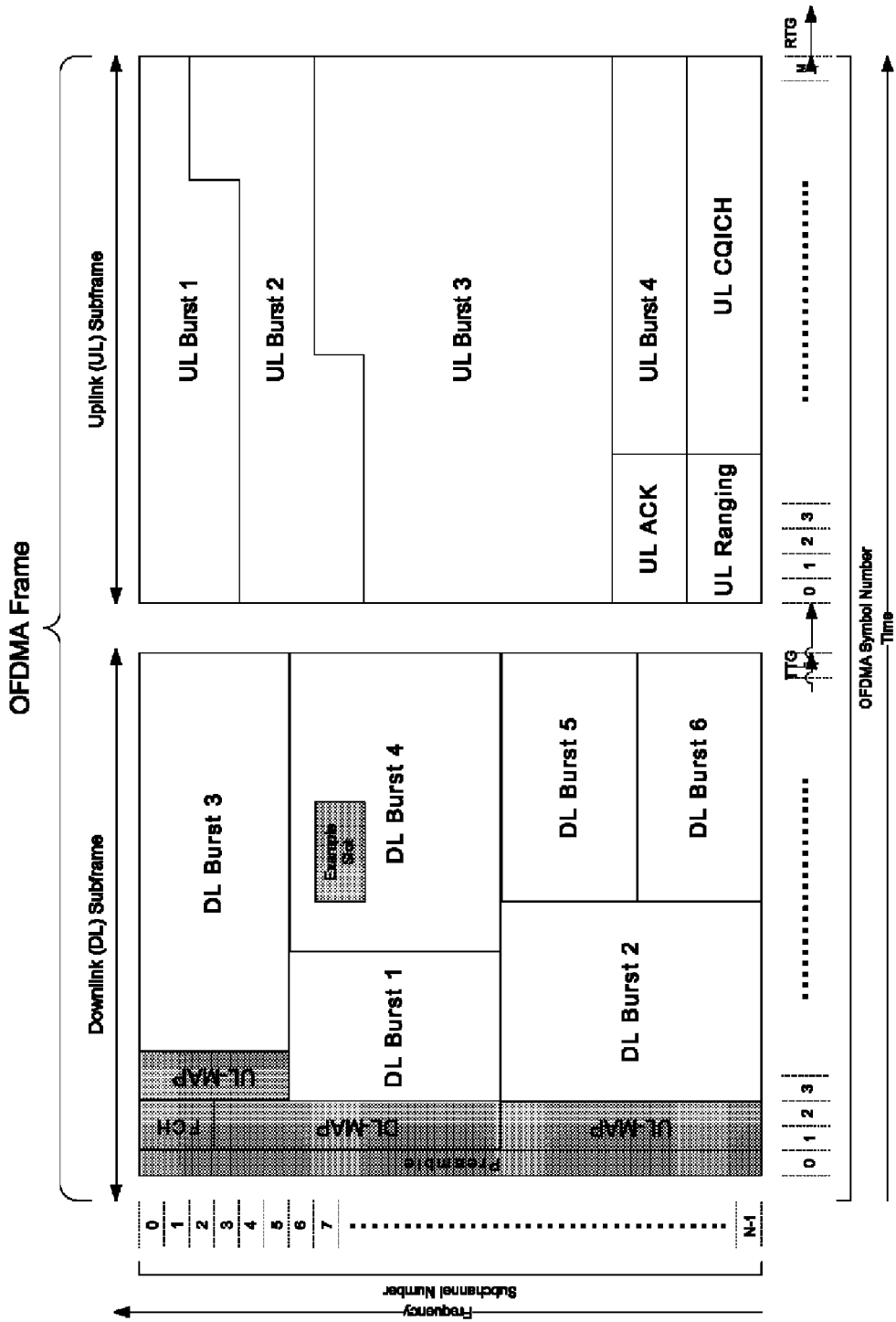
FIG. 5A. Exemplary Fully-Used OFDMA TDD Frame

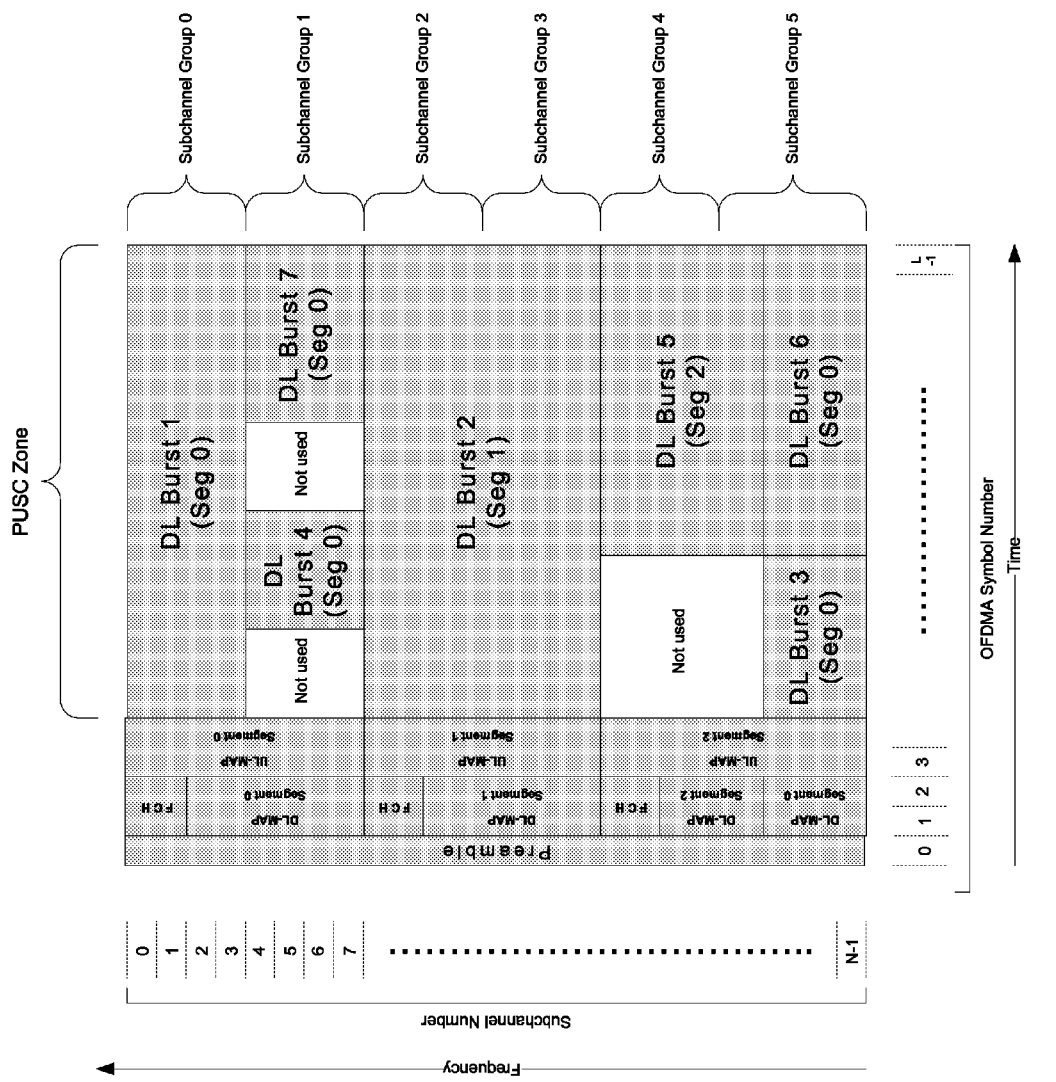
FIG. 5B. Exemplary Partially-Used TDD DL-OFDMA Subframe

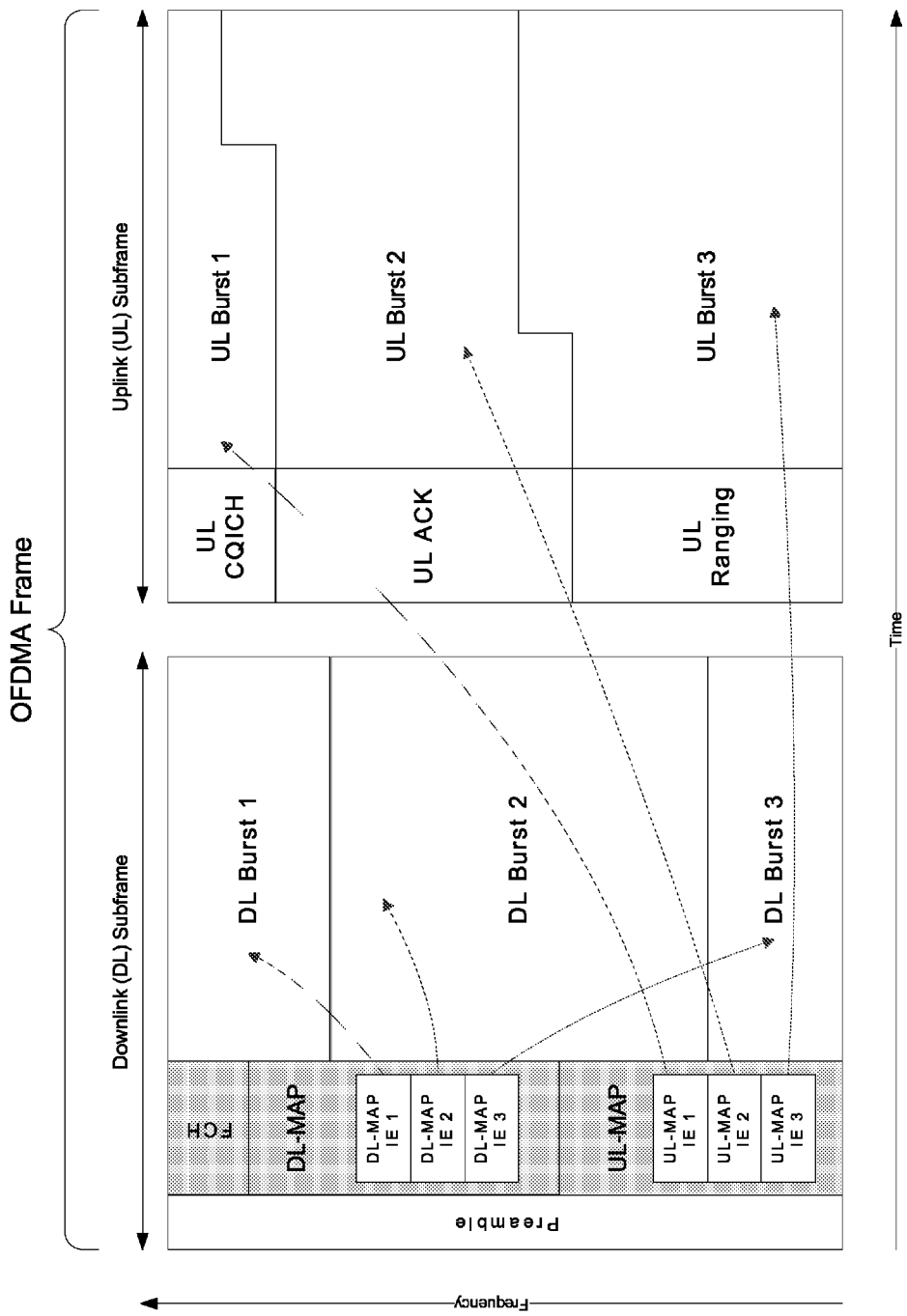
FIG. 5C. Exemplary Burst Allocation via DL and UL MAPs

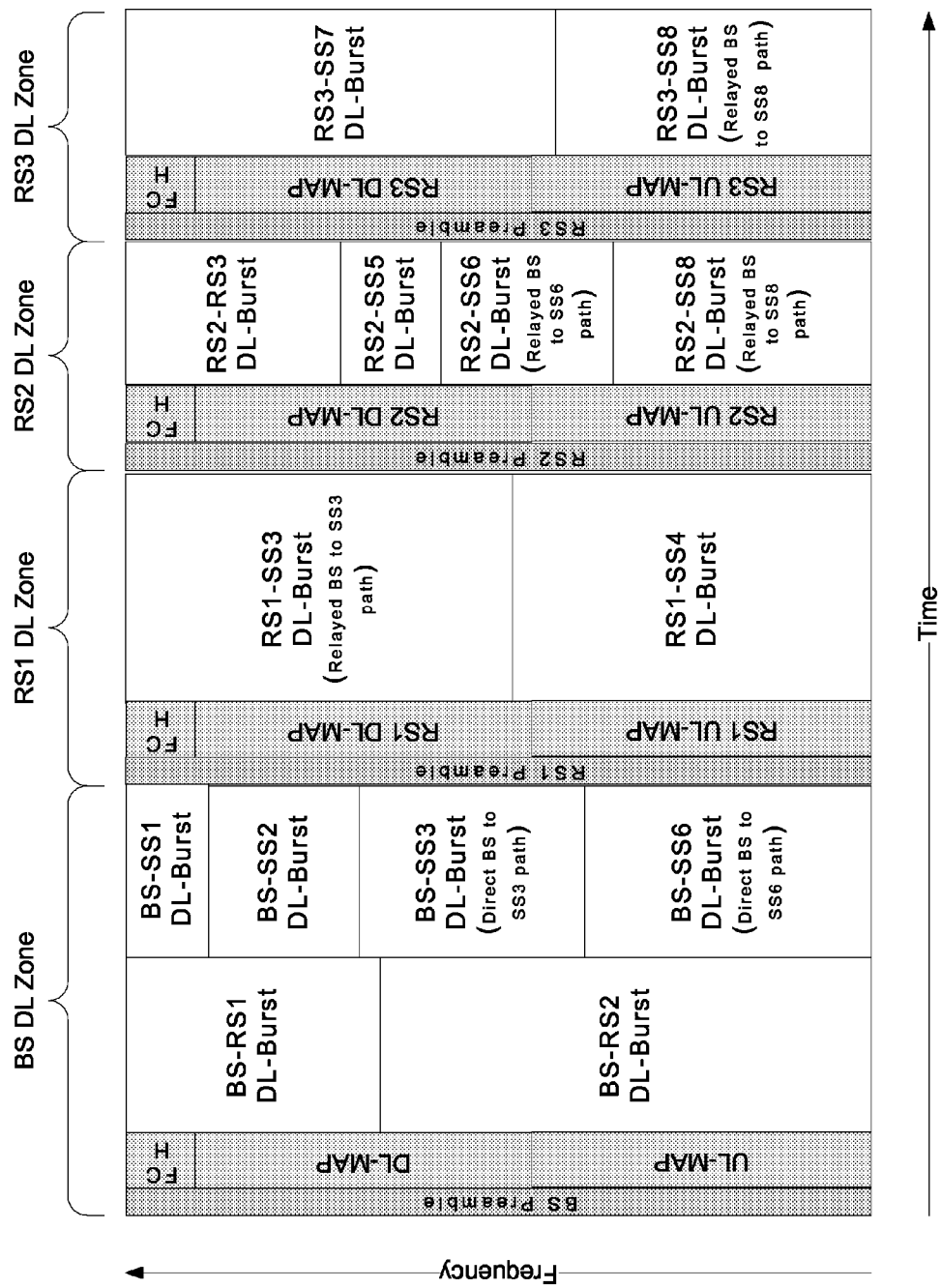
FIG. 6A. Exemplary TDD DL-OFDMA Subframe for a Single-frame Relaying Method without Frame Element Reuse

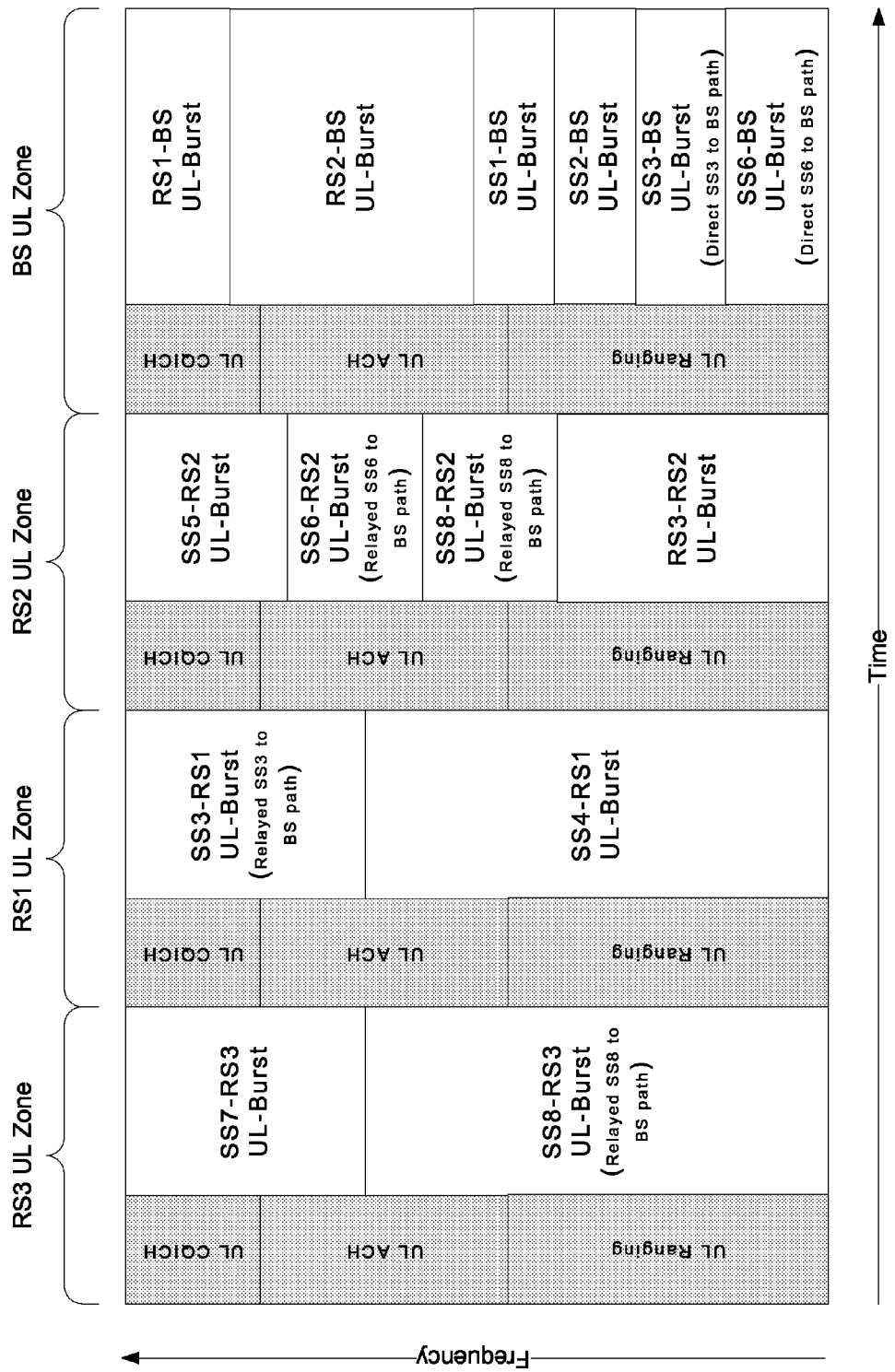
FIG. 6B. Exemplary TDD UL-OFDMA Subframe for a Single-frame Relaying Method without Frame Element Reuse

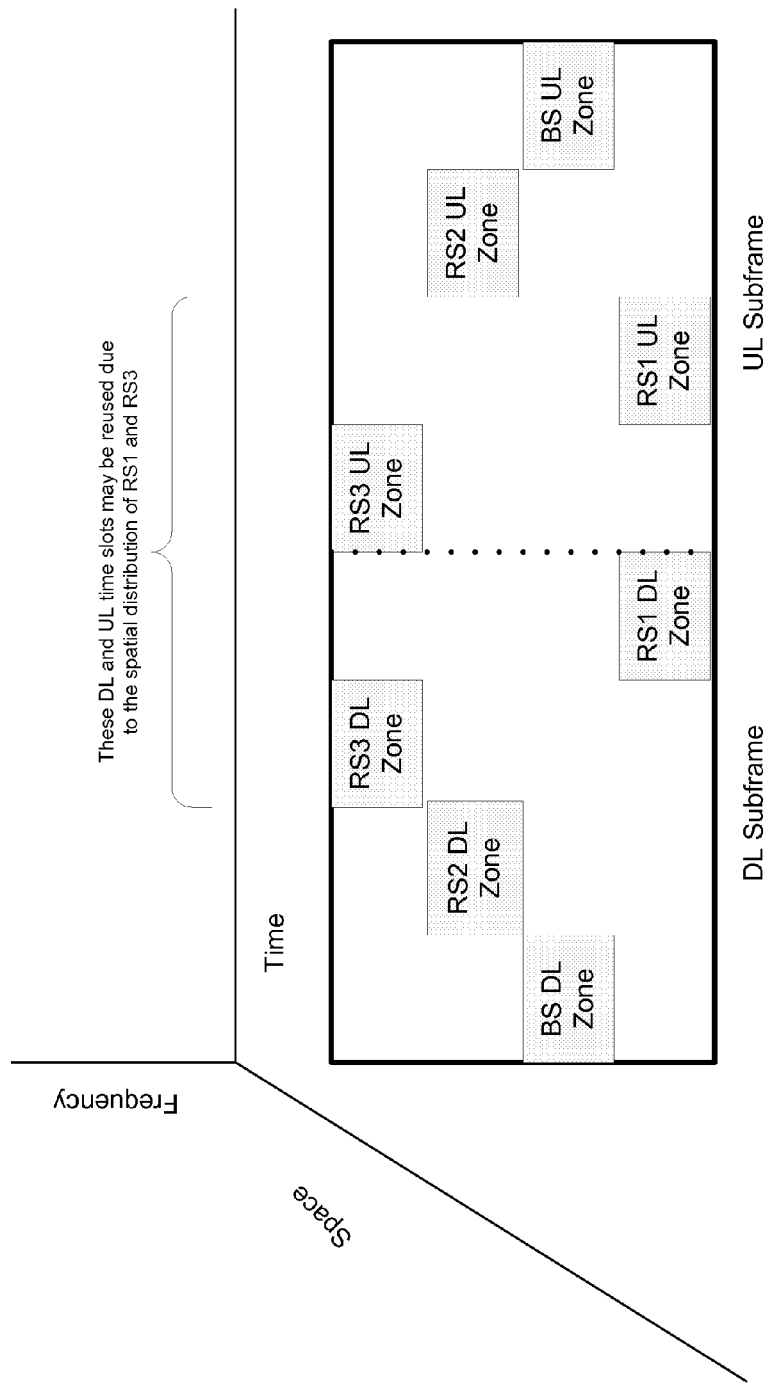
FIG. 6C. OFDMA Frame without Frame Element Reuse

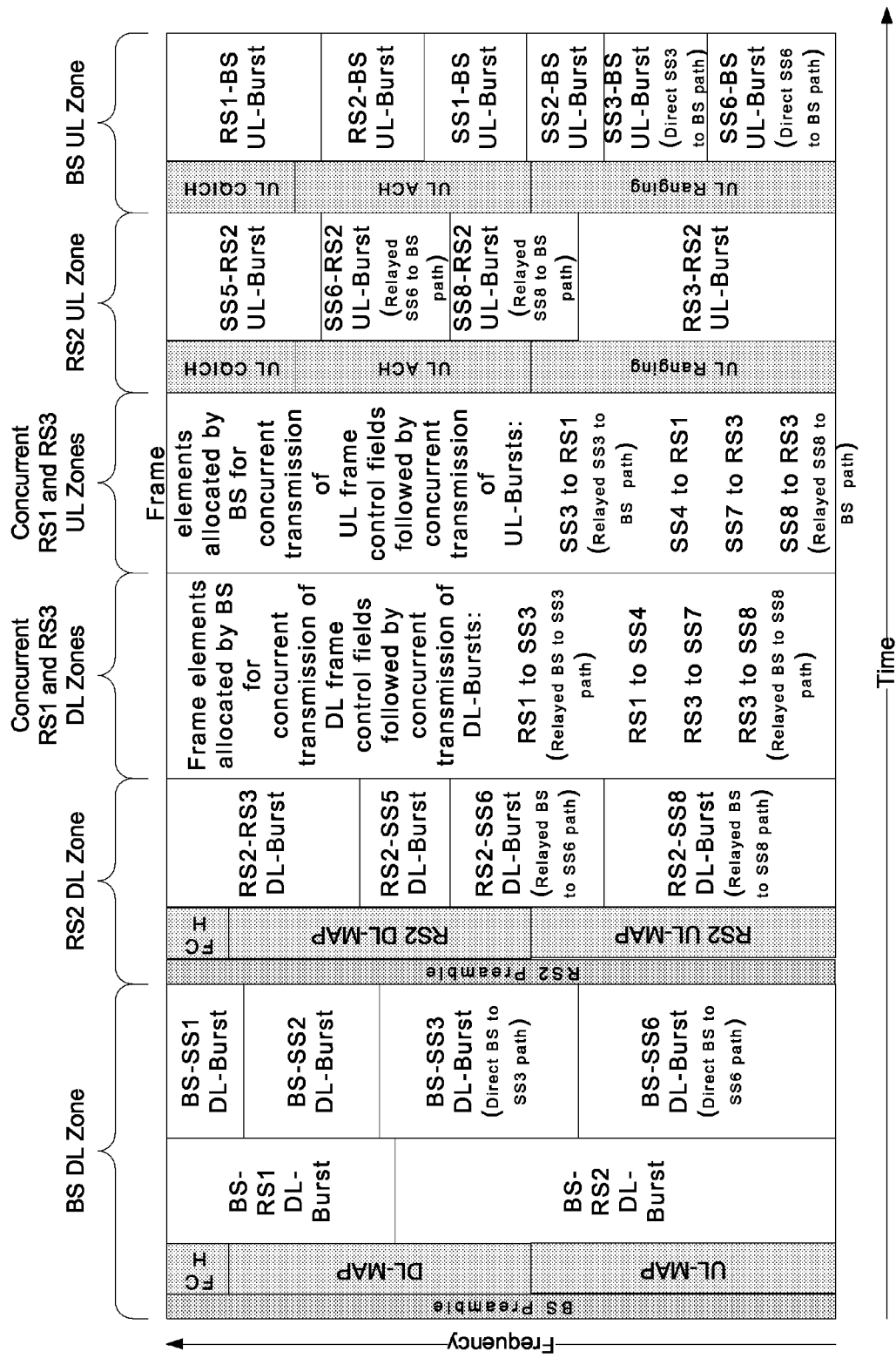
FIG. 7A. Exemplary OFDMA Frame for a Single-Frame Relaying Method with Frame Element Reuse

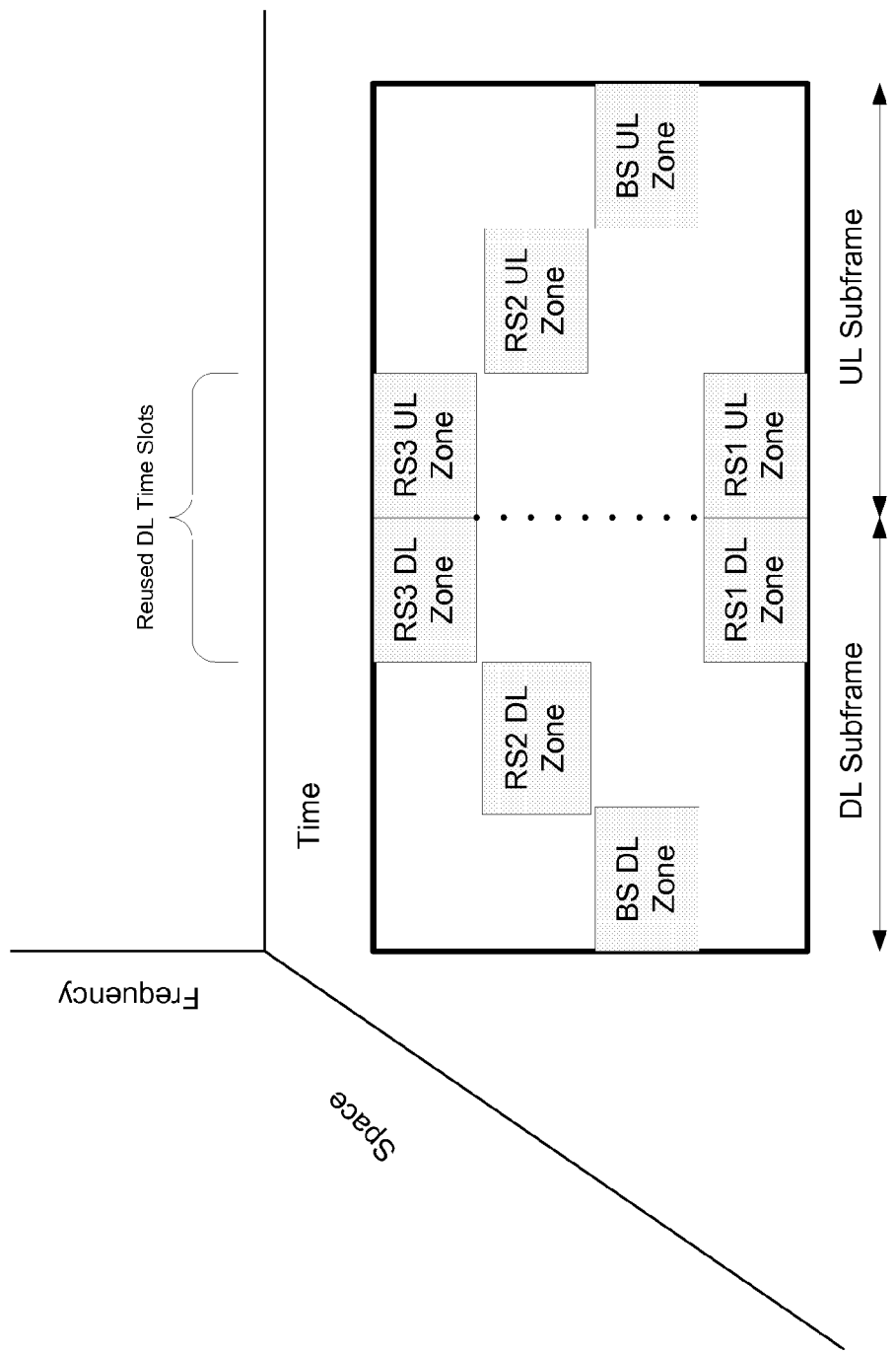
FIG. 7B. OFDMA Frame Element Reuse within Single-Frame Relaying Method

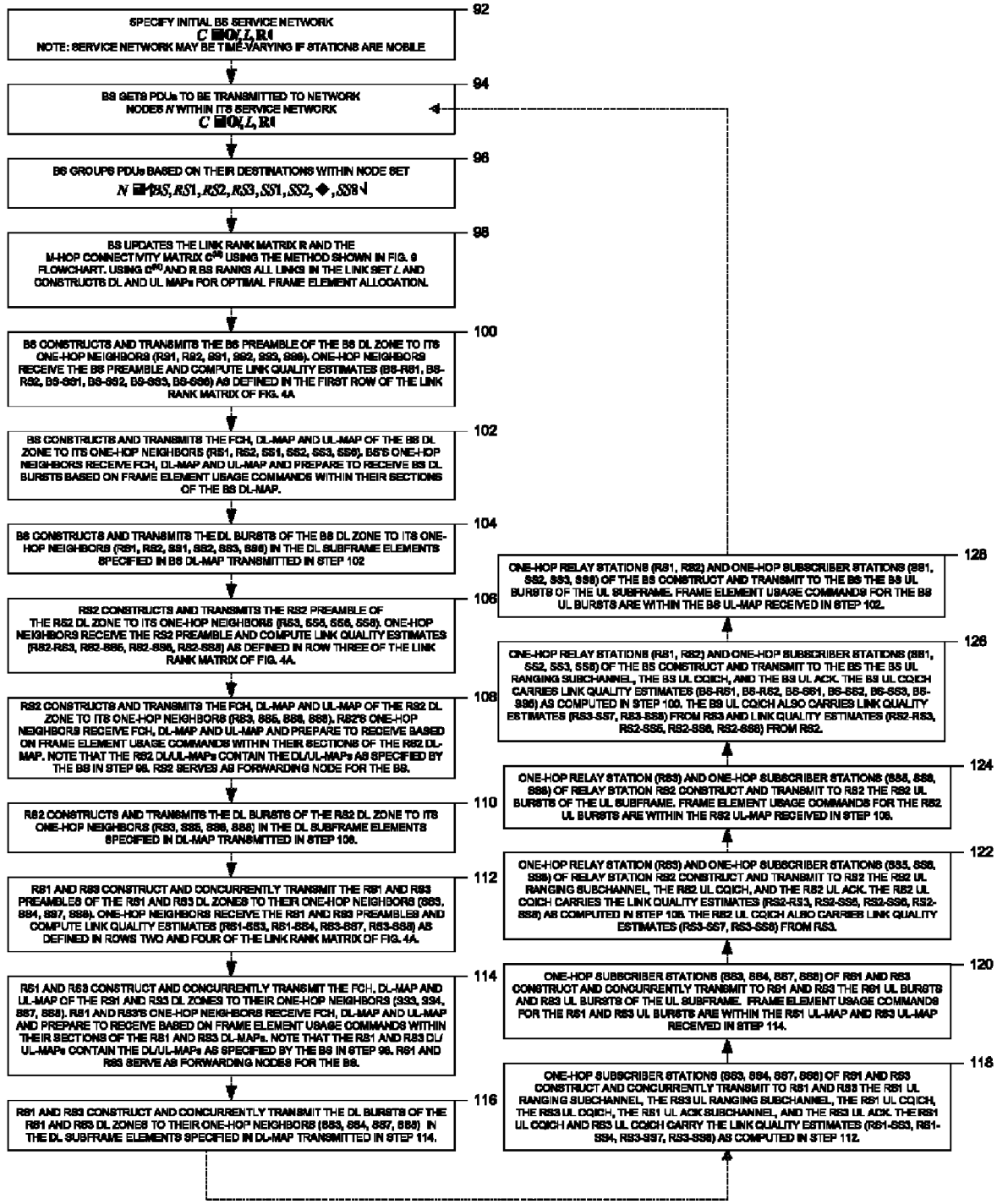
FIG. 8. Flowchart for OFDMA frame element allocation, transmission and reuse within a single-frame relaying method.

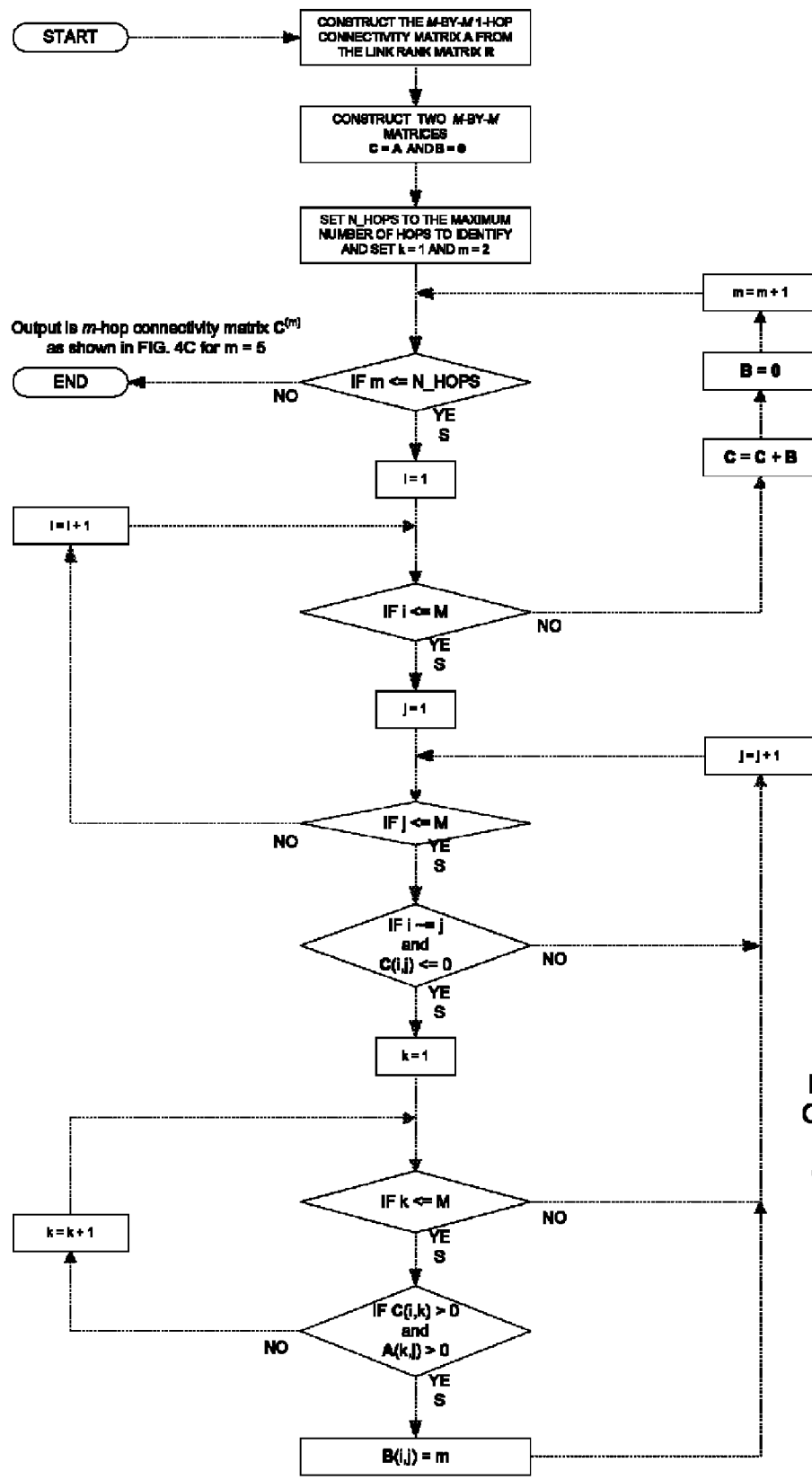
FIG. 9. Flowchart for Computing m-hop Link Connectivity Matrix $C^{(m)}$

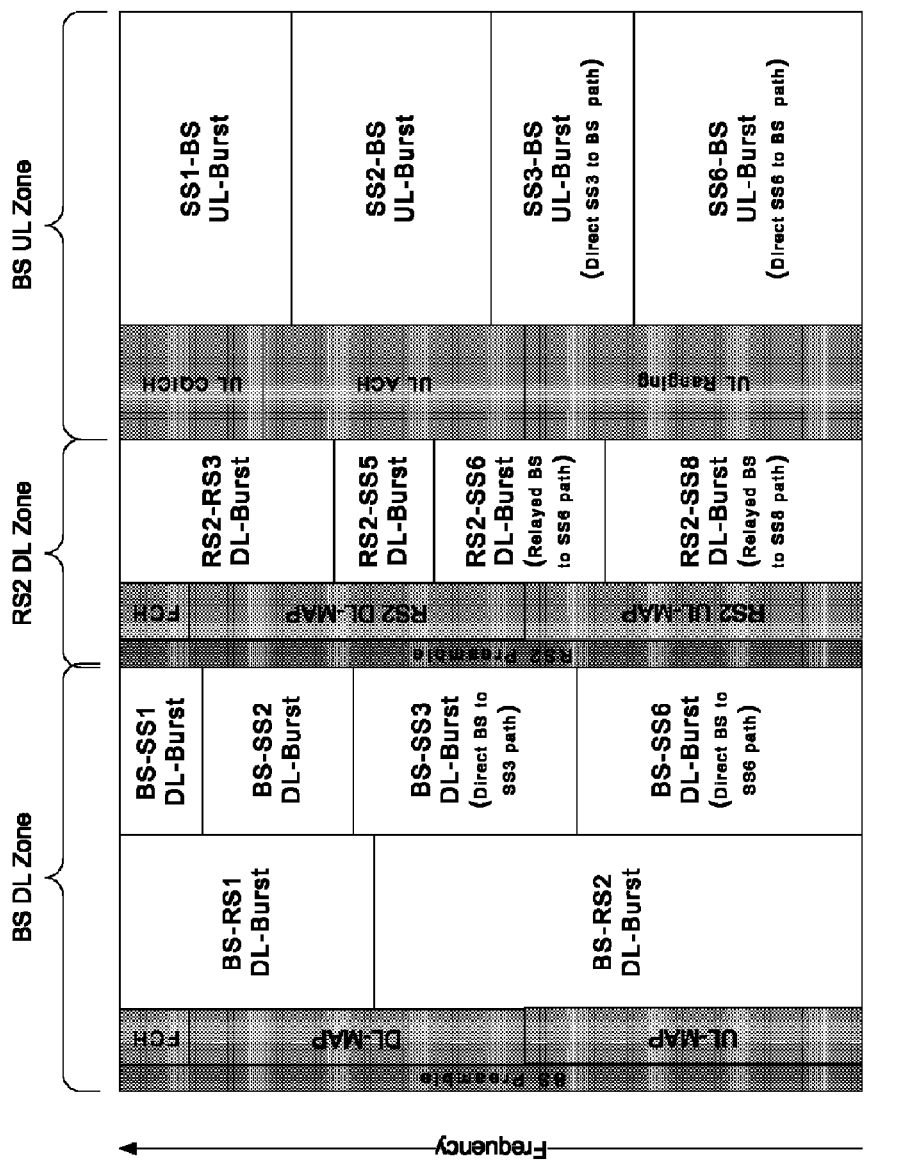
FIG. 10A. Exemplary Mth OFDMA Frame for Multi-frame Relaying Method

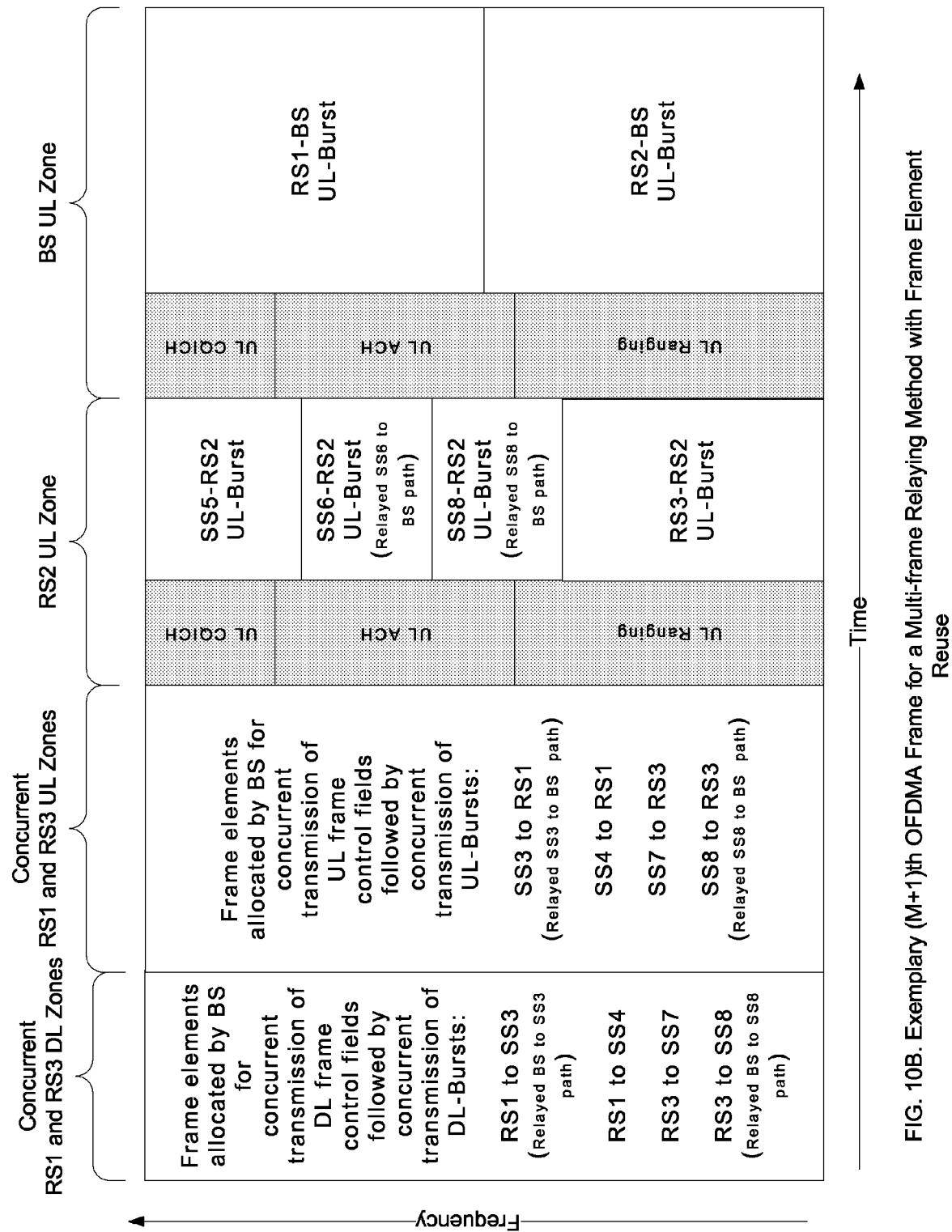
FIG. 10B. Exemplary (M+1)th OFDMA Frame for a Multi-frame Relaying Method with Frame Element Reuse

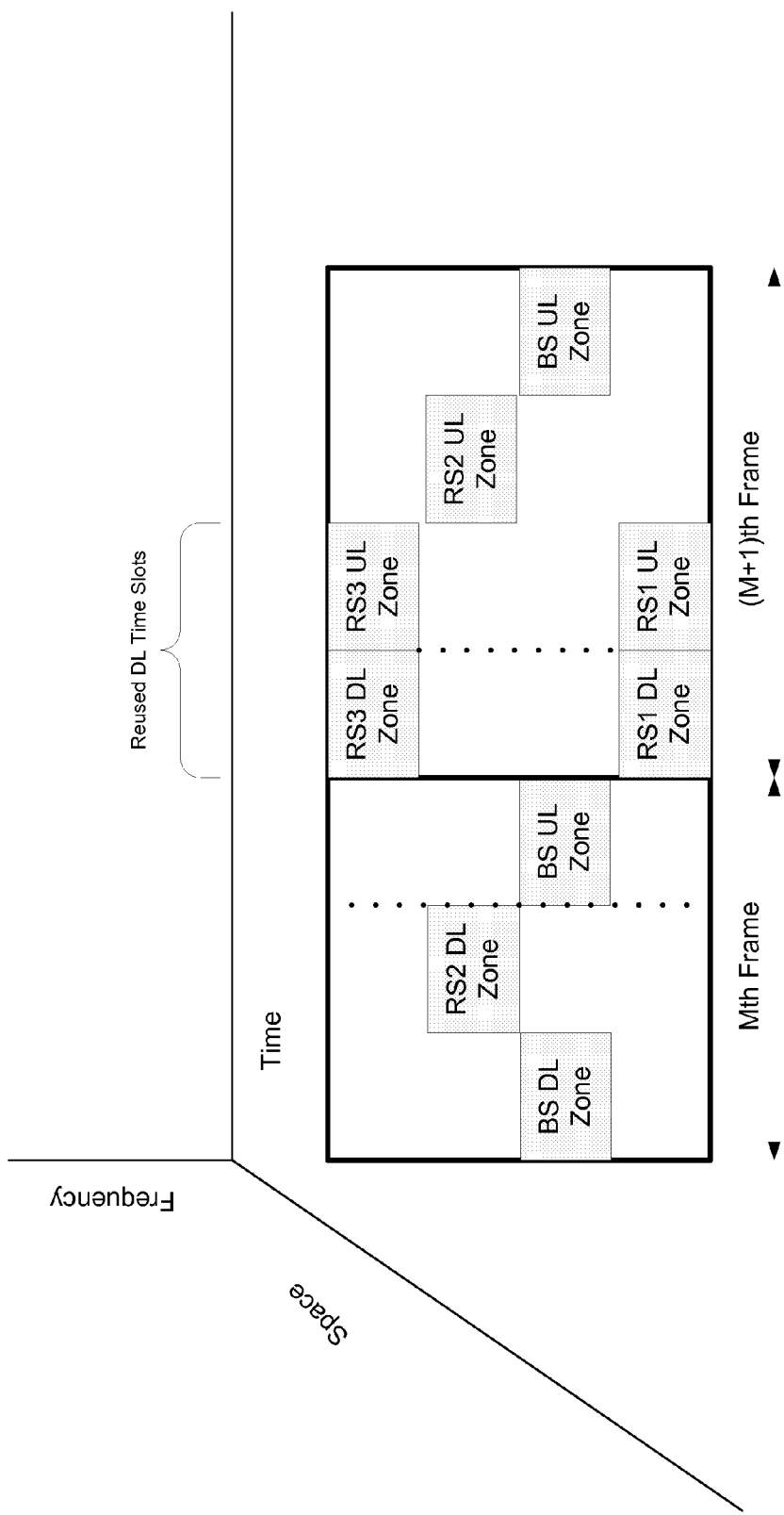
FIG. 10C. OFDMA Frame Element Reuse within Multi-frame Relaying Method

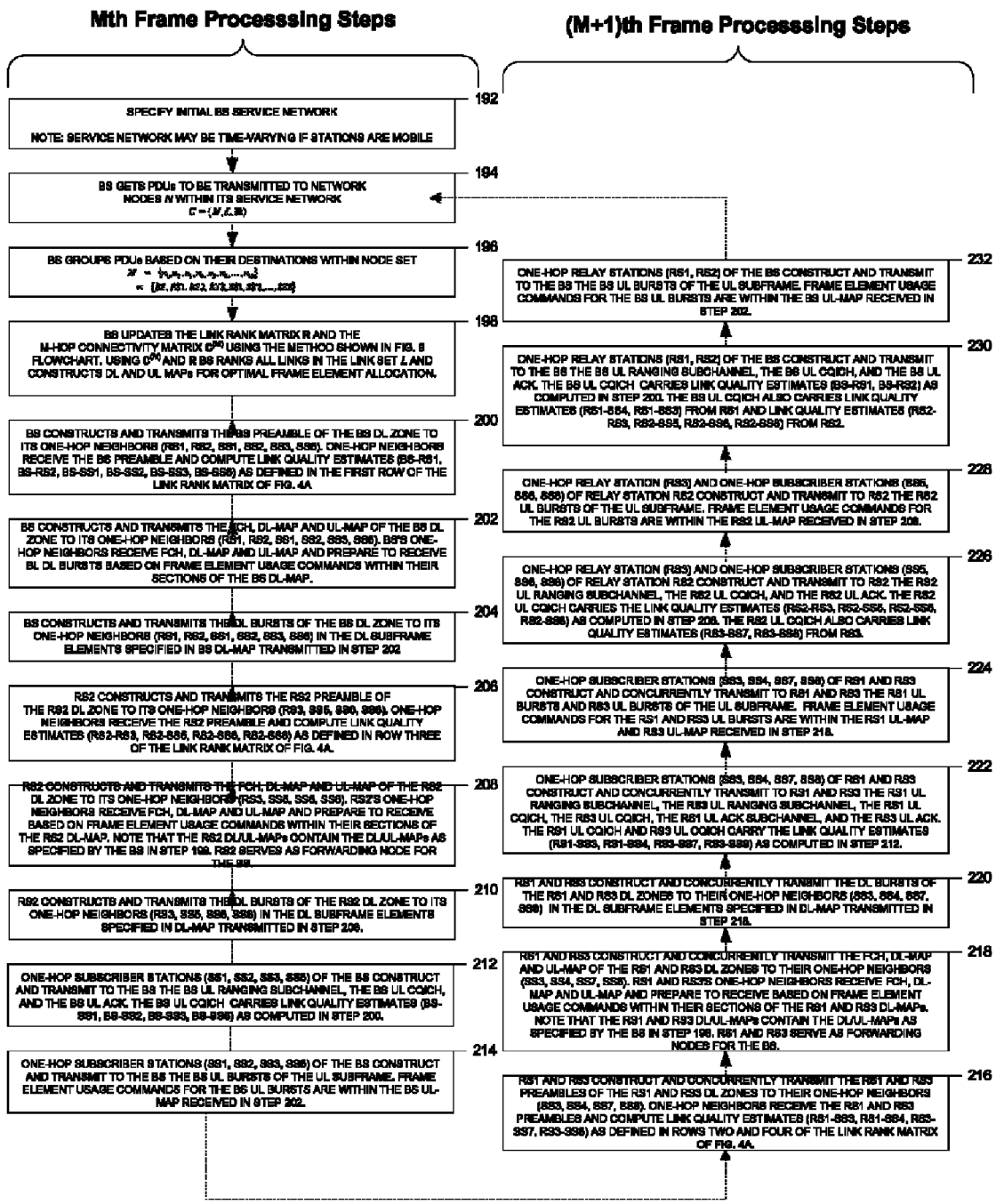
FIG. 11. Flowchart for OFDMA frame element allocation, transmission and reuse within a multi-frame relaying method

RADIO RESOURCE MANAGEMENT IN WIRELESS CELLULAR NETWORKS HAVING MULTIHOP RELAY STATIONS

PRIORITY CLAIM AND RELATED APPLICATION

This application claims benefit of U.S. Provisional Application No. 60/894,186 entitled "Radio resource management in wireless cellular networks having multihop relay stations" and filed on Mar. 9, 2007, which is incorporated by reference as part of the specification of this application.

BACKGROUND

This application relates to wireless communications, including communication systems, apparatus and techniques associated with wireless cellular networks that employ relay stations in addition to base stations.

Wireless cellular networks include stationary or fixed base stations that are spatially distributed over a network's service area to support communications for network subscriber stations (e.g. mobile phones, PDAs, laptop PCs, etc.). Allocated network channel frequencies are value resources and it is desirable to utilize such resources efficiently. Reusing allocated network channel frequencies to increase network capacity is one example for of various techniques for efficiently using the frequency resources. The reuse can be implemented, as one example, by partitioning a geographical area into a number of local radio communication service areas or cells and providing frequency reuse allocation that permits a channel frequency to be reused in certain non-adjacent cells. At the center of each cell is a fixed base station used for controlling the transmission and reception of protocol data units (PDUs) to and from subscriber stations distributed and roaming within its cell. In many wireless networks, base stations can transmit PDUs directly to subscriber stations via base station downlink (DL) radio signals; subscriber stations transmit PDUs directly to a base station via subscriber station uplink (UL) radio signals. DL and UL radio signals can be optimized based on dynamic channel and network conditions. Cell base stations communicate with each other either by point-to-point radio links, or by high capacity wireline based connections such as optical fibers.

SUMMARY

This application includes systems, apparatus and techniques for radio resource management for wireless cellular networks equipped with relay stations for multi-hop packet or protocol data unit (PDU) relaying.

In one aspect, a wireless cellular network with relay stations is described to include a plurality of base stations forming a base station network to provide wireless radio access for subscriber stations for wireless communications and a plurality of relay stations, each relay station being in wireless communication with at least one of the base stations and another relay station to extend a wireless coverage of the base station network. Each relay station establishes a link connection to a superordinate station, which is either a different relay station or a base station, to be connected to the base station network. This network includes a radio resource management mechanism that operates each base station to provide a base station link-quality matrix to indicate quality of a link between the base station to at least one or more relay stations subordinate to the base station, and one or more subscriber stations. Each element in the link-quality matrix corresponds to a network link and quantifies a quality of a link connecting to at least one or more relay stations subordinate to the base station, and one or more subscriber stations. The radio resource management mechanism operates to the base station to allocate frame elements in signal transmission based on the quality of a link between the base station to the at least one or more relay stations subordinate to the base station and the one or more subscriber stations.

In another aspect, a method for managing radio resource in a wireless cellular network with relay stations includes operating a base station to provide a base station link-quality matrix to indicate quality of a link between the base station to at least one or more relay stations subordinate to the base station, and one or more subscriber stations. Each element in the link-quality matrix corresponds to a network link and quantifies a quality of a link connecting to at least one or more relay stations subordinate to the base station, and one or more subscriber stations. This method includes operating the base station to allocate frame elements in signal transmission based on the quality of a link between the base station to the at least one or more relay stations subordinate to the base station and the one or more subscriber stations.

These and other aspects of described systems, apparatus and techniques are described in detail in the drawings, the description and the claims.

BRIEF DESCRIPTION OF DRAWINGS

FIG. 3 is the graphical representation of the wireless cellular network of FIG. 1.

FIG. 4A shows the link rank matrix for the wireless cellular network of FIG. 1.

FIG. 4B shows the one-hop connectivity matrix for the wireless cellular network of FIG. 1.

FIG. 4C shows the 5-hop connectivity matrix for the wireless cellular network of FIG. 1.

FIG. 5A illustrates an exemplary fully-used OFDMA TDD Frame.

FIG. 5B illustrates an exemplary partially-used OFDMA TDD Frame.

FIG. 5C illustrates an exemplary burst allocation via DL and UL MAPs according to an embodiment.

FIG. 6A illustrates an exemplary TDD DL-OFDMA subframe for a single-frame relaying method without frame element reuse.

FIG. 6B illustrates an exemplary TDD UL-OFDMA subframe for a single-frame relaying method without frame element reuse.

FIG. 6C illustrates an exemplary OFDMA frame without frame element reuse.

FIG. 7A illustrates an exemplary OFDMA frame for a single-frame relaying method with frame element reuse.

FIG. 7B illustrates exemplary OFDMA frame element reuse within single-frame relaying method.

FIG. 8 illustrates an example of a flowchart for OFDMA frame element allocation, transmission and reuse within a single-frame relaying method.

FIG. 9 illustrates a flowchart for computing an m-hop link connectivity matrix.

FIG. 10A illustrates an exemplary Mth OFDMA frame for a multi-frame relaying method.

FIG. 10B illustrates an exemplary (M+1)th OFDMA frame for a multi-frame relaying method.

FIG. 10C illustrates exemplary OFDMA frame element reuse within a multi-frame relaying method.

FIG. 11 illustrates an example of a flowchart for OFDMA frame element allocation, transmission and reuse within a multi-frame relaying method.

DETAILED DESCRIPTION

Figure 1:
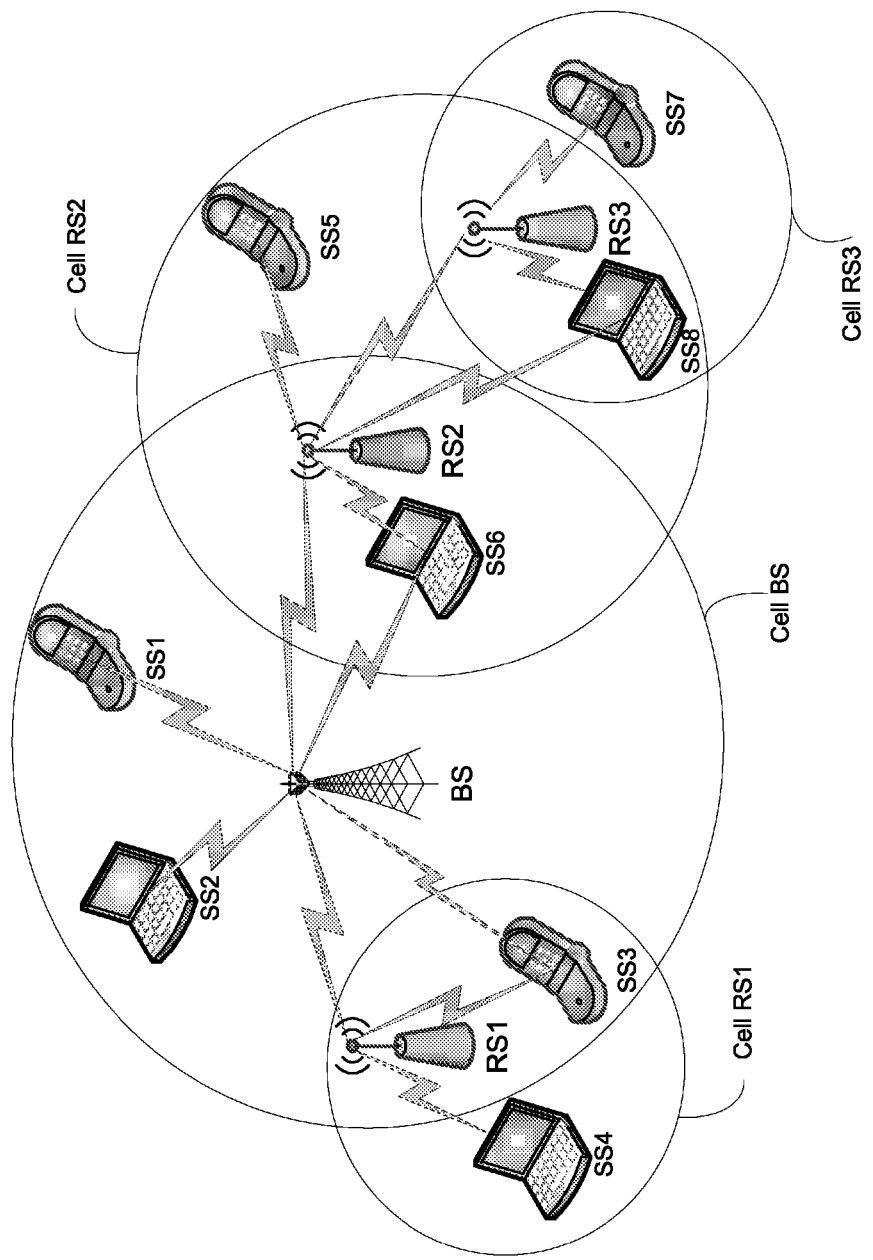
FIG. 1 shows an example of a wireless cellular network with relay stations.

The performance of wireless cellular networks may be affected by various factors. For example, the capacity and data throughput of a wireless cellular network can be degraded under network conditions such as unavailable or congested network spectrum and poor signal quality. The allocated spectral bands are becoming more and more congested with desired and undesired signals due to the proliferation of both intentional and unintentional electromagnetic emissions. Congested spectrum results in a combination of low and high power signals being simultaneously observed by a receiver's antenna or antenna array. Consequently, desired signals may be obscured and undetectable since they can be buried beneath much stronger clusters of interfering signals. The signal quality tends to be poor at cell edges due to neighboring cell interference and low DL and UL signal powers. Low power DL and UL signals result in a decrease in throughput since the base and subscriber stations adapt their signals (modulation and coding) to channel and network conditions. Other factors can also degrate the network performance, such as service coverage holes due to shadowing from various buildings, structures and trees, subscriber stations out of the radio signal range of any fixed base station, and non-uniform distribution of subscriber stations and traffic load due to urban hot spots and rural locations.

One approach to mitigating these and other adverse network conditions is to increase the number of base stations and thereby reduce base station cell size. Base stations are complex radio transceivers and include transmitting and receiving circuitry, control circuitry, digital signal processors and a single antenna or an antenna array. Designs and deployment of base stations can be configured to achieve optimal performance based on various factors such as the signal transmit power, antenna height and antenna spatial coverage or beamwidth. One concern for this approach are the high cost of base station installation and limited access to locations that support their installation. Indeed, the cost for deploying a cellular network is normally dominated by base station sites (e.g. real estate costs, planning, maintenance, distribution network, energy, etc.).

Another approach to mitigating these and other adverse network conditions is to use wireless relay stations that work with base stations. One or more relay stations (RSs) can be deployed among certain fixed base stations to relay communication signals between a subscriber station and a base station, thus extending the coverage and improving the communication capacity and quality of the base station. A relay station may be a fixed transceiver or a mobile transceiver station depending on the specific conditions for deploying such as relay station. A subscriber station signals may hop through one or more RSs before reaching a serving base station. The proposed IEEE 802.16j provides Multi-hop Relay (MR) modes to use relay stations for enhanced coverage and service to subscribers. A multi-hop relay wireless network under IEEE 802.16j can include MR base stations (MR-BSs) with the support of the Multi-hop Relay modes.

Relay stations are typically smaller in size and simpler in complexity than regular base stations. Hence, the use of relay stations can be less costly than expanding the radio coverage with the regular base stations and provide improvements in network capacity, data throughput and service area coverage. Conceptually a relay station can serve as a base station for a subscriber station and as a subscriber station for a base station. Relay stations can be managed by a base station, but they may also have some local control of relay functions within their cell of a cellular network. One or more relay stations can be deployed to relay or forward signals between subscriber stations and base stations. Subscriber station and base station PDUs may hop through one or more relay stations before reaching their desired destination.

FIG. 1 illustrates a portion of an exemplary wireless multi-hop relay communication system. This system includes multi-hop relay base stations (MR-BSs) and relay stations (e.g., RS1, RS2, and RS3) to provide radio coverage for serving one or more subscriber stations (e.g., SS1 to SS8). The base stations form a base station network to provide wireless radio access for wireless communications. Each relay station is in wireless communication with at least one of the base stations and another relay station to extend a wireless coverage of the base station network. Each relay station establishes a wireless link connection to a superordinate station, which is either a different relay station or a base station, to be connected to the base station network.

For example, the BS in FIG. 1 is shown to have three relay stations, RS1, RS2 and RS3 that expand the service coverage of the BS. The relay stations RS1, RS2 and RS3 are subordinate to the BS because the BS is connected to the network and is the gateway for the relations RS1, RS2 and RS3 to the rest of the network. Accordingly, the BS is the superordinate to the relay stations RS1, RS2 and RS3. In addition, it is possible for relay stations RS1, RS2 and RS3 under the control of the superordinate BS to have superordinate and subordinate relationships with one another. For example, the relay station RS3 is subordinate to the relay station RS2 because RS3 communicates to BS through RS2. Therefore, the relay station RS2 is the superordinate to the relay station RS3. In this context, BSs and relation stations in the system in FIG. 1 can be classified into superordinate base stations and subordinate base stations based on their relative relationships. Accordingly, the BS in FIG. 1 is the superordinate base station to all relay stations and the relay station RS2 is a subordinate base station to the BS but a superordinate base station to the relay station RS3. In FIG. 1, two subscriber stations SS3 and SS4 are shown to be in a coverage area of the RS1. Two subscriber stations SS5 and SS6 and one relay station RS3 are shown to be in a coverage area of RS2. The subscriber stations SS7 and SS8 are served by RS3. A relay station (RS) is introduced between a MR base station (MR-BS) and one or more subscriber stations (SSs) (e.g., a mobile subscriber station) or one or more additional subordinate relay stations.

The relay station deployment shown in FIG. 1 can be used to achieve certain advantages in various system implementations. For example, the throughput can be enhanced via the replacement of low rate, unreliable links with multiple high rate, reliable links; the radio coverage area can be extended to isolated network service areas; the power consumption can be reduced to increase the battery life for mobile subscriber stations; and efficient radio resource use and reuse cam be implemented due to the spatial distribution of network stations. Additional advantages include increased network capacity and improved network load sharing, flexible placement of base station or cell sites due to fewer access limitations, and better network fault tolerance and spatial diversity via multi-path redundancy.

Relay stations may be classified as fixed, nomadic or mobile. A fixed relay station is permanently installed at a location; a nomadic relay station may be moved but is fixed when operating. A mobile relay station may be placed on vehicle such as a bus, train or boat and is intended to operate while the vehicle is fixed or in motion. Relay stations can be classified according to their forwarding strategy. Examples of relay station forwarding strategies include Amplify-and-forward in which an amplify-and-forward relay station acts as an analog repeater and an amplify-and-forward relay station may increase the signal noise; Decode-and-Forward in which a decode-and-forward relay station decodes received PDUs, re-encodes and retransmits the received PDUs; and Decode-and-Reencode in which a decode-and-reencode relay station decodes a received PDU and constructs a codeword differing from the source codeword. Decode-and-reencode relay stations allow smart forwarding, can take advantage of adaptive transmission with different modulation and coding schemes on different network hops, and can participate in interference avoidance and mitigation schemes. The latter two relay station forwarding strategies may experience propagation of the decoding errors through a network path which may lead to a wrong decision at a destination.

Various relay station usage methods can be implemented. In one implementation, relay stations are configured and operated as signal forwarders that operate in a network path within the cellular network and each relay station in a network path relies solely on PDUs sent to it by its immediate path predecessor. Such relaying methods can be used to reduce the end-to-end network path loss between a PDU source and its destination. In another implementation, spatially distributed relay stations are configured and operated to cooperate with one another to provide spatial diversity. More specifically, relay station transmissions received at a destination may be combined to achieve spatial diversity. This spatial diversity via cooperation among the spatially distributed relaying stations is different from spatial diversity achieved via antenna arrays without having the integration of multiple antenna elements at a base, subscriber or relay station and without requiring signals received by antenna array elements to be uncorrelated for optimal performance. In scenarios where these conditions for the antenna array-based spatial diversity cannot be met, spatial diversity via cooperation among the spatially distributed relaying stations provides an alternative by distributing the antenna array elements among base, subscriber and relay stations to form a "virtual" antenna array.

Deployment of relay stations within current and future cellular networks poses many technical challenges in connection with various features in the networks such as PDU routing, radio resource management, use of advanced antenna technologies, network management, network security, and spatial diversity. To facilitate the deployment of relay stations new network subsystems and methods may be required. Further, it may be desirable that features for relaying methods be added to some cellular networks with minimal changes to the existing designs of subscriber and base stations.

Various features for radio resource management in a wireless multi-hop relay communication system are described in this application. One example is radio resource management (RRM) which concerns cellular network capacity issues rather than point-to-point channel capacity. RRM involves designing procedures, algorithms and data structures that direct, control and facilitate the optimal utilization of a network's radio-based communication links. Efficient dynamic RRM methods may be used to increase network capacity by an order of magnitude. RRM can be used in cellular systems that are limited by co-channel interference.

Examples of applications for the present RRM procedures, algorithms and data structures include, among others, mitigation of signal fading and signal degradations due to co-channel interference, noise, signal propagation distances, shadowing, multipath, and Doppler frequency shifts; radio or network connection admission control; scheduling and allocation of frame elements for PDU transmissions; cell design, cell sectoring, and cell-to-cell handoff; power control and allocation; adaptive modulation and error control coding; fixed and dynamic channel frequency selection and allocation; and bandwith reservation and quality of service guarantee. Techniques for radio resource reuse are also described in this application.

Figure 2:
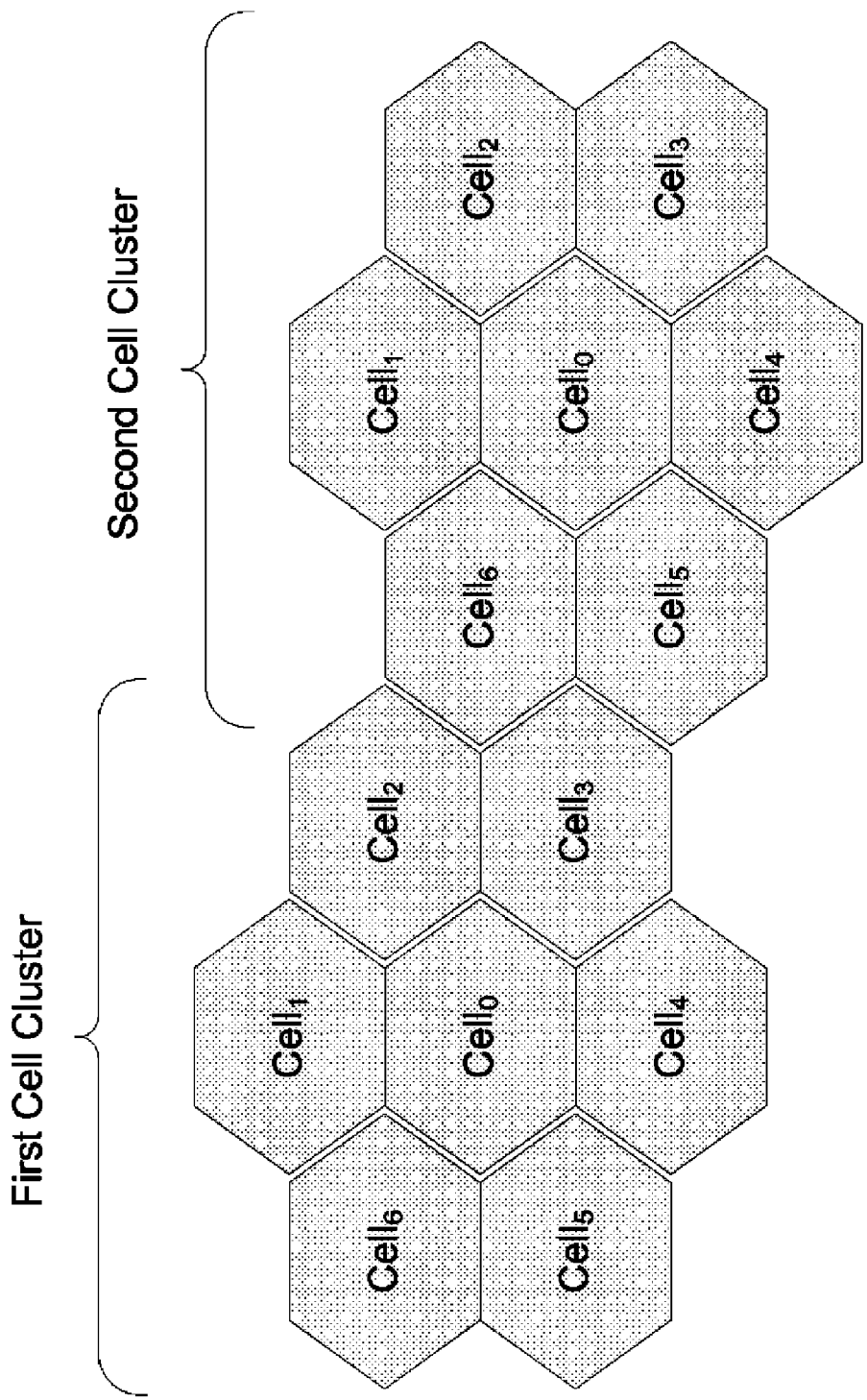
FIG. 2 shows an exemplary cell cluster pair that illustrates basic concept of radio resource reuse.

FIG. 2 shows an example of frequency reuse in two groups of seven hexagonal cells arranged as two cell clusters. Each cell in a cluster contains a base or relay station that is denoted by $Cell_i$, where the subscript $i=0, \ldots, 6$. Each base station or relay station in a cluster is allowed to use one of seven independent subsets of allocated radio resources (e.g. frequencies, time slots, etc.). Base and relay stations with the same index i use the same set of radio resources. Radio resources may be reused in another cell that is separated from the first by at least the reuse distance which is a distance such that interference between cells will not corrupt reception to a point where desired signals cannot be extracted from a received composite signal. The radio resource reuse concept allows base and relay stations in different cell clusters to simultaneously use and share a set of radio resources, thereby increasing network capacity.

In various practical system deployment, predominant interference within a cellular network can be classified as co-channel interference (CCI) and adjacent channel interference (ACI). CCI is typically observed by a receiver when a transmitter within an adjacent cell cluster is transmitting simultaneously on the receiver's frequency and the transmitter is within the receive range of the receiver. CCI can be controlled by restricting the separation of the transmitter to be greater than the reuse distance or by using some means of dividing the transmission and reception times between radios so that only one is transmitter operational at any one time. If two transmitters are operating within adjacent frequency bands, ACI may be result. ACI results when spectral components from signals which are adjacent in frequency are not fully isolated. For example, ACI would result due to nonideal modem filter characteristics. This can be minimized by judicious design of modulation scheme and filter design.

Systems, apparatus and methods described in this application may be implemented to achieve one or more advantages or benefits. For example, deployment of relay stations may result in a decrease in network capacity in some systems because PDUs may be relayed several times and therefore occupy multiple frame elements. Capacity for networks with relays can be substantially improved by reusing frame elements for different independent network links. The RRM aspect relates to the allocation, transmission and reuse of frame elements within multi-hop cellular networks equipped with relay stations. Systems, apparatus and methods described in this application can be implemented to provide a method for frame element allocation, transmission and reuse within multi-hop cellular networks. In some implementations, frame elements can be used to better support relayed PDU transmissions that occur between base, relay and subscriber stations, where relay and subscriber stations may be fixed, nomadic and/or mobile. Systems, apparatus and methods described in this application can also be implemented to provide increased network capacity and improve the spectral efficiency of individual relay station transmissions. For example, one disclosed method for frame element allocation, transmission and reuse can be used, in some implementations, to minimize interference so that no base, subscriber or relay station within the same network cell can transmit and receive simultaneously using the same frame elements. The frame elements can be spatially reused by base, subscriber and relay stations. In addition, the total number of frame elements can be kept at a minimum as available bandwidth and allowed delay are limited.

Various features described can be implemented within wireless cellular networks such as the exemplary network illustrated in FIG. 1 showing a portion of an exemplary wireless cellular network C with relay stations added to support multi-hop PDU relaying. This exemplary network includes one base station (BS) and three relay stations (RS1, RS2, and RS3). Working together the base station and relay stations provide radio coverage to subscriber stations (SS1 to SS8). The circles enclose the coverage areas of the BS and RSs. For example, subscriber stations SS3 and SS4 are shown to be within the coverage area or cells of the RS1 and the outer edge of the BS cell.

In FIG. 1, subscriber stations SS1 and SS2 are directly served by the base station without hopping through any relay stations. The base station communicates with SS5 and SS6 via RS2 so downlink PDUs from the base station is first transmitted to RS2, RS2 then transmits the PDUs to SS5 and SS6. Base station downlink PDUs for SS7 and SS8 go through two hops via RS2 and RS3. The base station communicates with SS3 and SS4 via RS1, therefore the DL PDUs are first sent from the BS to RS1, RS1 then sends the PDUs to SS3 and SS4.

FIG. 3 shows a graph structure of the exemplary network of FIG. 1. The network graph of FIG. 3 is defined by the triple C=(N, L, R) where N, L and R are defined below. Set N is the network's M-element node set comprised of base stations, subscriber stations and relay stations:

$$N = \{n_1, n_2, n_3, n_4, n_5, n_6, \ldots, n_{12}\}$$
$$= \{BS, RS1, RS2, RS3, SS1, SS2, \ldots, SS8\}$$

Set L is a network link set comprised of node pairs; each pair denotes a link connection within the network, that is, $$L=\{(BS,SS1),(BS,SS2),(BS,RS1),\ldots,(RS3,SS7),(RS3,SS8)\}$$

Matrix R contains link ranks or weights; each element in R corresponds to a link L.

FIG. 4A shows the link rank matrix R for the wireless cellular network of FIG. 1. For the network of FIG. 3, values of zero within the rank matrix R indicate that no link exists between a network node pair. The non-zero link ranks may be any radio resource measurement value or combination that indicates the quality of network link. For example, the value BS-RS1 (row 1, column 2 in R) may contain a four bit link-quality value such as $$BS - RS1 = \begin{cases} 0 & \text{if } 0 < \text{SINR}(BS - RS1) \leq \alpha_1 \\ 1 & \text{if } \alpha_1 < \text{SINR}(BS - RS1) \leq \alpha_2 \\ 2 & \text{if } \alpha_2 < \text{SINR}(BS - RS1) \leq \alpha_3 \\ 3 & \text{if } \alpha_3 < \text{SINR}(BS - RS1) \end{cases}$$

SINR (BS-RS1) denotes an estimate of the ratio of signal power to interference-plus-noise for the network link BS-RS1 and $\alpha_i$, i=1, 2, 3, specified SINR decision region bounds.

A network path of hop-length P from a source node to a sink node is a sequence of P links. Network paths within C are elementary meaning all nodes in a path are traversed only once. Network paths within C contain no cycles meaning the initial and final nodes in a path are distinct. The rank of a network path is defined as the summation of its link ranks.

Let $N_{subnet}$ be a subset of N. A subnetwork $C_{subnet}$ of C is derived from the set difference $N-N_{subnet}$. Specifically, $C_{subnet}$ is derived from N by removing all nodes and links associated with $N_{subnet}$. For example, FIG. 3 illustrates a subnetwork derived from the set difference $$N - N_{subnet} == N - \{BS, RS1, RS2, SS1, SS2, SS3, SS4, SS5, SS6\}.$$

Exemplary Method for Multi-Hop Connectivity Identification

FIG. 4B shows the one-hop connectivity matrix for the wireless cellular network of FIG. 1. FIG. 4C shows the 5-hop connectivity matrix for the wireless cellular network of FIG. 1.

The 1-hop network connectivity matrix $C^{(1)}$ for an arbitrary M-node network C=(N, L, R) is defined as the M-by-M matrix $C^{(1)} = \{c_{ij}^{(1)}\}_{i,j=1}^{M}$ where $$c_{ij}^{(1)} = \begin{cases} 1 & \text{If a link from node } n_i \text{ to } n_j \text{ exists} \\ 0 & \text{If a link from node } n_i \text{ to } n_j \text{ does not exist} \\ 0 & \text{If } i = j \end{cases}$$

$C^{(1)}$ can be obtained from the ranking matrix R of FIG. 4A by the applying specified 1-bit quantization map to the elements of R. FIG. 4B shows the one-hop network connectivity matrix $C^{(1)}$ for the exemplary network of FIG. 1.

More generally the m-hop connectivity matrix for network C is defined by the M-by-M matrix $C^{(m)} = \{c_{ij}^{(m)}\}_{i,j=1}^{M}$ where $$c_{ij}^{(m)} = \begin{cases} m & \text{Node } n_i \text{ is connected to } n_j \text{ by a path of } P = m \text{ links or hops} \\ 0 & \text{otherwise} \end{cases}$$

The element $c_{ij}^{(m)}$ is computed using the iterative equation $$c_{ij}^{(m)} = c_{ij}^{(m-1)} + \psi_{ij}^{(M)}, \, m \geq 2$$

where $$\psi_{ij}^{(m)} = \begin{cases} 0 & \text{If } i = j \\ 0 & \text{If } c_{ij}^{(m-1)} > 0 \\ m & \text{If } \sum_{k=1}^{M} c_{ik}^{(m-1)} c_{kj}^{(1)} > 0 \text{ when } i \neq j \text{ and } c_{ij}^{(m-1)} = 0 \\ 0 & \text{Otherwise} \end{cases}$$

FIG. 4C shows the 5-hop network connectivity matrix $C^{(5)}$ for the exemplary network of FIGS. 1 and 2. FIG. 10 shows a flowchart of one exemplary method for computing the 5-hop network connectivity matrix $C^{(m)}$.

Exemplary Cellular Network Physical Layer

Various described features can be applied to Orthogonal Frequency Division Multiplexing (OFDM), Orthogonal Frequency Division Multiple Access (OFDMA), and Time Division Duplexing (TDD). Examples of physical layers for these technologies are described below.

OFDM is a technique for multicarrier data transmission that has been standardized for several wireless network physical layers. In OFDM, an allocated channel is divided into a number of orthogonal subchannels. Each subchannel has an equal bandwidth and is centered on the unique frequency of a subcarrier signal. The subcarrier signals are orthogonal in that the inner product of any two of the subcarriers equals zero. The frequencies of the orthogonal subcarrier signals are equally and minimally spaced so data modulation of the subcarrier signals facilitates optimal bandwidth efficiency. In comparison, frequency division multiplexing for multicarrier data transmission utilizes non-orthogonal subcarrier signals and therefore wastes large segments of allocated channel bandwidth in order to isolate subcarrier signal frequency spectra.

OFDMA is a multi-user version of OFDM. Multiple access is achieved in OFDMA by assigning subsets of orthogonal subcarriers to individual subscriber stations. OFDMA can be described as a combination of frequency domain and time domain multiple access where radio resources are partitioned in a time-frequency space, and network user data bursts are assigned along the OFDM symbol index as well as OFDM sub-carrier index. The addition of relay stations within a cellular network allows for OFDMA with time, frequency and spatial domain multiple access. Simultaneous data transmissions between several subscriber stations, base station or relay stations may occur if they are spatially distributed and their interference to each other is below a specified threshold.

OFDMA physical layers can be configured to use Time Division Duplexing (TDD). To counter interference issues, TDD uses system-wide synchronization. TDD has certain advantages when compared to Frequency Division Duplexing (FDD). For example, TDD efficiently supports asymmetric bandwidth for downlink (DL) and uplink (UL) signals; TDD enables channel reciprocity for better support of link adaptation, MIMO and other signal processing methods; TDD only uses a single channel for DL and UL signals thereby providing flexibility for various spectrum usage requirements; and transceiver designs for TDD systems are less complex than FDD.

Exemplary Frame Structure and Elements

Applications based on the exemplary OFDMA frame structure are described within this subsection.

An OFDMA frame includes DL and UL transmissions. FIG. 5A illustrates exemplary OFDMA frame structure for a physical layer based on TDD. Each frame is divided into DL and UL subframes that are respectively separated by a Transmit Transition Gap (TTG) and a Receive Transition Gap (RTG). These two gaps prevent DL and UL transmission collisions. Each subframe is comprised of a number of frame elements. These frame elements are the radio resources that may be allocated, transmitted and reused. FIG. 5B illustrates an exemplary partially-used OFDMA TDD Frame.

FIG. 5A and FIG. 5B illustrate exemplary OFDMA frame elements for Zone, Burst, Slot, Subchannel, Subchannel Group, Symbol, and Segment.

Zone:
A OFDMA frame includes one or more zones. A zone is one complete logical part or partition of an OFDMA frame. There are different types of DL and UL zones. Zones may use all of the OFDM signal subchannels or only a subset of the subchannels. Zones that use all of the OFDM signal subchannels are called Fully Used Subchannel (FUSC) zones; those that use a subset of the subchannels are called Partially Used Subchannel (PUSC) zones. See FIG. 5B for an exemplary PUSC zone within a DL subframe.

Burst:
A zone includes DL or UL bursts. A burst is an area within a zone that uses a specified number of subchannels (frequencies) and a specified number of OFDM symbols (time slots). See FIG. 5A and FIG. 5B for examples.

Slot:
A burst includes slots. A slot is the minimum possible data allocation unit within a OFDMA-based system and is defined in time and frequency. A slot has one subchannel and can contain a number of OFDM symbols (depending on the zone type). See FIG. 5A for an example.

Subchannel:
A subchannel is the smallest logical allocation unit within the frequency domain and has one or more subcarriers that are normally non-adjacent carriers and whose order may change within a burst from OFDM symbol to symbol. FIGS. 5A and 5B show N subchannels for the frames.

Subchannel Group:
A subchannel group is comprised of one or more subchannels. See FIG. 5B for an example.

Symbol:
A symbol is the smallest allocation unit in the time domain. FIG. 5A shows DL and UL subframes comprised of L and M symbols.

Segment:
A segment is a set of OFDMA subchannel groups. FIG. 5B shows three segments within a DL subframe.

An OFDMA frame may have various control fields to manage the usage of the frame elements. Exemplary control fields are shown within FIG. 5C.

Preamble:
The preamble is used for DL synchronization (frame timing acquisition, frequency offset estimation, symbol timing estimation) and channel estimation and is the first OFDM symbol of an OFDMA frame. As an example, the preamble can be a binary phase shift keying (BPSK) modulated preamble or in other modulation formats. The preamble is a reference field known by all network receivers.

Frame Control Header (FCH):
The FCH follows the preamble field and is transmitted using quadrature phase shift keying (QPSK) rate 1/2 channel coding and four-fold repetition encoding (four subchannels with successive logical subchannel numbers). The FCH provides frame configuration information such as the following: Subchannel groups used on the first DL-PUSC zone and DL-MAP (Medium Access Protocol) info. The DL-MAP includes subchannels used, subchannel repetition coding used in DL-MAP, channel coding used in DL-MAP, and DL-MAP length.

DL-MAP and UL-MAP:
The DL-MAP and UL-MAP provide frame element allocation and other control information for the DL and UL sub-frames, respectively. The DL/UL map begins with header information followed by one or more DL-MAP/UL-MAP information elements (DL-MAP/UL-MAP IEs).

UL Ranging:
The UL ranging subchannel is allocated for subscriber or relay stations to perform closed-loop time, frequency, and power adjustment as well as bandwidth requests. Four types of ranging are defined: initial ranging for when a SS enters the network; periodic ranging after a connection is set up, handover ranging, and bandwidth request.

UL channel quality indicator channel (CQICH):
The UL CQICH is used by subscriber or relay stations to feedback channel-state information.

UL ACK:
The UL ACK is used by subscriber or relay stations to feedback DL Hybrid-ARQ acknowledgements.

Frame Element Allocation

In some implementations, the base station can be used to allocate frame elements (slots, bursts, zones, subchannels, subchannel groups, etc.) for all PDU transmissions between the base station, relay stations and subscriber stations. The frame element allocation by the base station may be based on one or more factors: (1) link quality as indicated by elements of the link rank matrix R (FIG. 4A) and/or the link connectivity matrices (FIGS. 4B and 4C), (2) the size of a PDU to be transmitted, and (3) the type of PDUs (described by frame control fields) that an RS can support and forward to other base, subscriber and relay stations within its coverage area.

The base station can allocate frame elements based on the location and spatial distribution of the base station and relay and subscriber stations. The base station can concurrently use or reuse frame elements whenever the spatial distribution of communicating network stations is such that their co-channel interference to each other is below certain reasonable levels. For example the cell coverage areas of RS1 and RS3 in FIG. 1 do not overlap. Hence, frame elements for RS1 and RS3 can be concurrently used to further enhance network capacity and throughput.

A base station may be pre-configured with network link connection information or may be operated to acquire network link connection information. Such network link connection information indicates the coverage areas of its subordinate relay stations. Using network link connection information, a base station can optimally allocate DL subframe elements to its subordinate relay stations. For example, assume that there are two or more relay stations with no overlapped downlink coverage (e.g. RS1 and RS3 of FIG. 1 or 2), or in other words, their co-channel interference to each other is below certain reasonable levels. Using link connection information as in the link rank matrix R and/or the connectivity matrices (see FIG. 4A, FIG. 4B and FIG. 4C) the base station can command relay stations RS1 and RS3 to concurrently use or reuse the same frame elements for their downlink PDU transmissions to the subscriber stations within their coverage areas.

A base station may be pre-configured with network link connection information or may be operated to acquire network link connection information. Such network link connection information indicates the coverage areas of its subordinate relay stations. Using network link connection information a base station can optimally allocate UL subframe elements to its subordinate relay stations. For example, assume that there are two or more relay stations with no overlapped downlink coverage (e.g. RS1 and RS3 of FIG. 1 or 2), or in other words, their co-channel interference to each other is below certain reasonable levels. Using link connection information as in the link rank matrix R and/or the connectivity matrices (see FIG. 4A, FIG. 4B and FIG. 4C) the base station can command relay stations RS1 and RS3 to concurrently use or reuse the same frame elements for their uplink PDU transmissions to the BS and RS2 within their respective coverage areas.

Frame Element Transmission for Single-Frame Relaying

A base station can be configured to have the option of selecting a single-frame relaying (SFR) method. In a single-frame relaying (SFR) method DL and UL transmissions between a BS and its subordinate relay and subscriber stations can occur using a single OFDMA frame. Relay stations in a source-to-sink network path need to synchronize with each other so PDUs are quickly hopped from station to station within the network path.

FIG. 6A shows an exemplary DL subframe structure for an SFR method. FIG. 6B displays an exemplary UL subframe structure for an SFR method. FIG. 6C shows an exemplary OFDMA frame without frame element reuse.

FIG. 7A shows an exemplary subframe for an SFR Method that may be used to facilitate frame element reuse. FIG. 7B clarifies how frame slots may be reused by RS1 and RS3 due to the spatial distribution of RS1 and RS3. Using an SFR method source-to-sink PDU transmission time is less compared to a multi-frame relaying method (described below) but may require more complex hardware so relay stations with a path can process received PDUs within a specified time interval.

DL Subframe Transmission for Single-Frame Relaying

Referring to FIG. 7A, FIG. 7B and to the flowcharts in FIG. 8 and FIG. 9, the steps for the allocation and transmission of DL subframe elements for a single-frame relaying method are described below.

In step 92 the base station initializes a network graph defined by the triple C=(N, L, R). Set N is the network's M-element node set comprised of base stations, subscriber stations and relay stations, set L is a network link set comprised of node pairs; each pair denotes a link connection within the network, matrix R contains link ranks or weights; each element in R corresponds to a link L within C. Network C includes all network nodes for which the base station allocates frame elements to carry PDU transmissions.

In step 94 the base station obtains one or more PDUs that are to be transmitted to nodes within its service network C defined above.

In step 96 the base station the groups the PDUs according to their destination nodes within the node N of the service network C.

The ranks or weights of all links within the link set L are contained within the link rank matrix R. In step 98 the base station first updates the link rank matrix R (see FIG. 4A). The link rank matrix R can be easily updated from link quality estimates returned to the base station by relay and subscriber stations via their UL channel quality indicator channels. This is described below and shown in FIG. 9 by the horizontal arrow to block 94. Using the updated R the base station then updates the m-hop connectivity matrix $C^{(m)}$ (FIG. 4C). The flowchart for the method of updating $C^{(m)}$ based on updates of R is shown in FIG. 9. This process can be implemented as an application of an algorithm published by L. E. Miller, "Multihop Connectivity of Arbitrary Networks," Wireless Communication Technologies Group, NIST, Tech Report (March 2001).

In one embodiment, network C can contain mobile and/or nomadic relay and subscriber stations so node set N and link set L can change. Hence, $C^{(m)}$ is acquired and updated at different time intervals using the method of FIG. 9. In another embodiment, the base station can be pre-configured with $C^{(m)}$. For example, if all network relay and subscriber stations are fixed in location the base station could be pre-configured with a fixed $C^{(m)}$ and only R would need to be updated.

Using the updated link ranks within R, the updated link connectivity matrix $C^{(m)}$, and an appropriate ranking algorithm the base station then ranks and selects the optimal paths for transmitting PDUs to their destinations. More specifically, a number of candidate paths may exist between the base station and a desired PDU destination node. Using R and $C^{(m)}$ the base station can rank all candidate paths and select the optimal path. For example, FIG. 3 shows two possible paths from the base station to subscriber station SS6, both a one-hop and two-hop path exist. The base station may rank the two paths using the link rank BS-SS6 for the one-hop path and a simple summation of the link ranks BS-RS2 and RS2-SS6 for the two-hop path.

Using the outputs of the ranking algorithm the base station then optimally allocates or apportions frame elements (slots, bursts, zones, subchannels, subchannel groups, and segments) that are to be used by the relay and subscriber stations within its service network C. The base station then constructs DL and UL MAPs based on the optimal frame element allocation.

In another embodiment, path diversity may be implemented by receiving relay and subscriber stations. For example, referring to FIG. 7A it is seen that frame bursts are allocated for both of the two paths to SS6 as described above. One is marked "Direct BS to SS6 path" the other is marked "Relayed BS to SS6 path." For clarity only the RS2 DL burst is marked in FIG. 7A. The BS DL burst would be the BS-RS2 burst of the BS-DL Zone. The UL bursts for two-hop path is also marked in a similar manner within FIG. 7A. The base station may use both paths or one of the two paths. Signal processing methods that exploit the path diversity can therefore be implemented in subscriber station SS6.

In step 100 the base station constructs and transmits the BS Preamble of the DL subframe. The BS Preamble is a reference signal known by all receivers within the exemplary network C of FIG. 3. It is used by the base station's one-hop relay stations (RS1, RS2) and its one-hop subscriber stations (SS1, SS2, SS3, SS6) for DL synchronization (frame timing acquisition, frequency offset estimation, symbol timing estimation) and link or channel quality estimation. RS1, RS2, SS1, SS2, SS3 and SS6 use the BS Preamble to obtain link quality estimates BS-RS1, BS-RS2, BS-SS1, BS-SS2, BS-SS3 and BS-SS6 as defined in the first row of the link rank matrix of FIG. 4A. These link quality estimates can be returned to the base station in the UL frame so the base station can update R.

In steps 102 and 104 the base station constructs and transmits the BS DL Zone of the DL subframe. As shown in FIG. 7A, the BS DL Zone is comprised of an FCH, DL-MAP, UL-MAP and DL bursts that are to be transmitted by the base station to its one-hop relay stations (RS1, RS2) and its one-hop subscriber stations (SS1, SS2, SS3, SS6). The DL and UL burst allocations for the Base Station DL and UL Zones are specified by the BS using information elements (IEs) that are within the BS Downlink Map (DL-MAP) and BS Uplink Map (UL-MAP). FIG. 5C shows an exemplary group of DL-MAP and UL-MAP IEs and their usage in allocating bursts. The base station's one-hop neighbors (RS1, RS2, SS1, SS2, SS3, SS6) receive the BS DL Zone and prepare to receive DL data and transmit UL data based on frame element usage commands within their sections of the DL-MAP and UL-MAP. These MAPs were derived by the BS according to step 98.

In step 106 relay station RS2 constructs and transmits the RS2 Preamble of the DL subframe. The RS2 Preamble is a reference signal known by all receivers within the exemplary network C of FIG. 2. It is used by relay station RS2's one-hop relay station (RS3) and its one-hop subscriber stations (SS5, SS6, SS8) for DL synchronization (frame timing acquisition, frequency offset estimation, symbol timing estimation) and link or channel quality estimation. RS3, SS5, SS6, and SS8 use the RS2 Preamble to obtain link quality estimates RS2-RS3, RS2-SS5, RS2-SS6 and RS2-SS8 as defined in row three of the link rank matrix of FIG. 4A. These link quality estimates can be returned to the base station in the UL frame so the base station can update R.

In steps 108 and 110 relay station RS2 constructs and transmits the RS2 DL Zone of the DL subframe. As shown in FIG. 7A, the RS2 DL Zone is comprised of an FCH, DL-MAP, UL-MAP and DL bursts that are to be transmitted by RS2 to its one-hop relay station RS3 and its one-hop subscriber stations (SS5, SS6, SS8). The DL and UL burst allocations for the RS2 DL and UL Zones are specified by RS2 using information elements (IEs) that are within the RS2 Downlink Map (DL-MAP) and RS2 Uplink Map (UL-MAP). RS2's one-hop neighbors (RS3, SS5, SS6, SS8) receive the RS2 DL Zone and prepare to receive DL data and transmit UL data based on frame element usage commands within their sections of the DL-MAP and UL-MAP. These MAPs were originally derived by the BS according to step 98 so RS2 serves as a MAP forwarding node for the BS.

In step 112 relay stations RS1 and RS3 concurrently construct and transmit the RS1 Preamble and the RS3 Preamble of the DL subframe. The RS1 Preamble is a reference signal known by all network receivers. It is used by SS3 and SS4 for DL synchronization (frame timing acquisition, frequency offset estimation, symbol timing estimation) and channel estimation. SS3 and SS4 can use the RS1 Preamble to obtain link quality estimates RS1-SS3 and RS1-SS4 as defined in row two of the link rank matrix of FIG. 4A. The RS3 Preamble is a reference signal known by all network receivers. It is used by SS7 and SS8 for DL synchronization (frame timing acquisition, frequency offset estimation, symbol timing estimation) and channel estimation. SS7 and SS8 can use the RS3 Preamble to obtain link quality estimates RS3-SS7 and RS3-SS8 as defined in row four of the link rank matrix of FIG. 4A. These link quality estimates can be returned to the base station in the UL frame so the base station can update R.

In steps 114 and 116 relay stations RS1 and RS3 construct the RS1 DL Zone and the RS3 DL Zone of the DL subframe. Because of the spatial distribution of RS1 and RS3 downlink zones for RS1 and RS3 are transmitted concurrently using the same frame elements (see FIG. 7B for clarification). The RS1 DL Zone is comprised of an FCH, DL-MAP, UL-MAP and DL bursts that are to be transmitted by RS1 to its one-hop subscriber stations (SS3, SS4). The RS3 DL Zone is comprised of an FCH, DL-MAP, UL-MAP and DL bursts that are to be transmitted by RS3 to its one-hop subscriber stations (SS7, SS8). For clarity these fields are not shown within FIG. 7A. If shown they would have a similar structure to that shown for the RS2 DL Zone. The DL and UL burst allocations for the RS1 DL and UL Zones are specified by RS1 using information elements (IEs) that are within the RS1 Downlink Map (DL-MAP) and RS1 Uplink Map (UL-MAP). The DL and UL burst allocations for the RS3 DL and UL Zones are specified by RS3 using information elements (IEs) that are within the RS3 Downlink Map (DL-MAP) and RS3 Uplink Map (UL-MAP). RS1's one-hop neighbors (SS3, SS4) receive the RS1 DL Zone and prepare to receive DL data and transmit UL data based on frame element usage commands within their sections of the DL-MAP and UL-MAP. RS3's one-hop neighbors (SS7, SS8) receive the RS3 DL Zone and prepare to receive DL data and transmit UL data based on frame element usage commands within their sections of the DL-MAP and UL-MAP. The RS1 and RS3 MAPs were originally derived by the BS according to step 98 so RS1 and RS3 serve as a MAP forwarding nodes for the BS.

UL Subframe Transmission for Single-Frame Relaying

Referring to FIG. 7A, FIG. 7B and to the flowcharts in FIG. 8 and FIG. 9, the steps for the allocation and transmission of UL subframe elements for a single-frame relaying method are described below.

In steps 118 and 120 the one-hop subscriber stations (SS3, SS4) of relay station RS1 and the one-hop subscriber stations (SS7, SS8) of RS3 concurrently construct the RS1 UL Zone and the RS3 UL Zone of the UL subframe. The RS1 UL Zone is comprised of data bursts that are to be transmitted from one-hop subscriber stations (SS3, SS4) to RS1. The RS3 UL Zone is comprised of data bursts that are to be transmitted from one-hop subscriber stations (SS7, SS8) to RS3. Because of the spatial distribution of RS1 and RS3 uplink zones for RS1 and RS3 are transmitted concurrently using the same frame elements (see FIG. 7B for clarification). Burst allocations for the RS1 and RS3 UL Zones are specified using information elements within the RS1 Uplink Map (UL-MAP) and the RS3 Uplink Map (UL-MAP) received in step 114. Information for RS1's UL-MAP are obtained from the base station via a one-hop DL burst from the BS to RS1. Information for RS3's UL-MAP are obtained from the base station via a two-hop DL burst from the BS to RS2 to RS3.

The Uplink zones for RS1 and RS3 also include an RS1 UL Ranging Subchannel, an RS3 UL Ranging Subchannel, an RS1 UL CQICH (channel quality indicator channel), an RS3 UL CQICH, an RS1 UL ACK subchannel, and an RS3 UL ACK subchannel. For clarity these fields are not shown within FIG. 7A. If shown they would have a similar structure to that shown in the RS2 UL Zone.

The RS1 UL ranging subchannel is used by RS1's one-hop subscriber stations (SS3, SS4) to perform closed-loop time, frequency, and power adjustment as well as bandwidth requests. The RS3 UL ranging subchannel is used by RS3's one-hop subscriber stations (SS7, SS8) to perform closed-loop time, frequency, and power adjustment as well as bandwidth requests.

The RS1 UL CQICH (channel quality indicator channel) is used by RS1's one-hop subscriber stations (SS3, SS4) to feedback channel-state information to RS1. Specifically the link quality estimates RS1-SS3 and RS1-SS4 as defined in row two of the link rank matrix of FIG. 4A. The base station can use these estimates to update the link rank matrix R shown in FIG. 4A.

The RS3 UL CQICH (channel quality indicator channel) is used by RS3's one-hop subscriber stations (SS7, SS8) to feedback channel-state information to RS3. Specifically the link quality estimates RS3-SS7 and RS3-SS8 as defined in row four of the link rank matrix of FIG. 4A. The base station can use these estimates to update the link rank matrix R shown in FIG. 4A.

The RS1 UL ACK is used by RS1's one-hop subscriber stations (SS3, SS4) to feedback DL Hybrid-ARQ acknowledgements to RS1. The RS3 UL ACK is used by RS3's one-hop subscriber stations (SS7, SS8) to feedback DL Hybrid-ARQ acknowledgements to RS3.

In steps 122 and 124 the one-hop relay station (RS3) and the one-hop subscriber stations (SS5, SS6, SS8) of relay station RS2 construct and transmit the RS2 UL Zone of the UL subframe. The RS2 UL Zone is comprised of data bursts that are to be transmitted to RS2 from its one-hop relay station RS3 and its one-hop subscriber stations (SS5, SS6, SS8). Burst allocations for the RS2 UL zone are specified using information elements within the RS2 Uplink Map (UL-MAP) field.

The RS2 UL ranging subchannel is used by RS2's one-hop relay station (RS3) and its one-hop subscriber stations (SS5, SS6, SS8) to perform closed-loop time, frequency, and power adjustment as well as bandwidth requests.

The RS2 UL CQICH (channel quality indicator channel) is used by RS2's one-hop relay station (RS3) and its one-hop subscriber stations (SS5, SS6, SS8) to feedback channel-state information to RS1. Specifically the link quality estimates RS2-RS3, RS2-SS5, RS2-SS6 and RS2-SS8 as defined in row three of the link rank matrix of FIG. 4A. The base station uses these estimates to update the link rank matrix R shown in FIG. 4A.

The RS2 UL ACK is used by RS2's one-hop relay station (RS3) and its one-hop subscriber stations (SS5, SS6, SS8) to feedback DL Hybrid-ARQ acknowledgements to RS2.

In steps 126 and 128 the one-hop relay stations (RS1, RS2) and the one-hop subscriber stations (SS1, SS2, SS3, SS6) of the base station BS construct and transmit the BS UL Zone of the UL subframe. The BS UL Zone is comprised of data bursts that are to be transmitted to the BS from its one-hop relay stations (RS1, RS2) and its one-hop subscriber stations (SS1, SS2, SS3, SS6). Burst allocations for the BS UL Zone can be specified using information elements within the BS Uplink Map (UL-MAP).

The BS UL ranging subchannel is used by the base station's one-hop relay stations (RS1, RS2) and its one-hop subscriber stations (SS1, SS2, SS3, SS6) to perform closed-loop time, frequency, and power adjustment as well as bandwidth requests.

The BS UL CQICH (channel quality indicator channel) is used by the base station's one-hop relay stations (RS1, RS2) and its one-hop subscriber stations (SS1, SS2, SS3, SS6) to feedback channel-state information to the BS. Specifically the link quality estimates BS-RS1, BS-RS2, BS-SS1, BS-SS2, BS-SS3, and BS-SS6 as defined in row one of the link rank matrix of FIG. 4A. The base station uses these estimates to update the link rank matrix R shown in FIG. 4A.

The BS UL ACK is used by the base station's one-hop relay stations (RS1, RS2) and its one-hop subscriber stations (SS1, SS2, SS3, SS6) to feedback DL Hybrid-ARQ acknowledgements to the BS.

Frame Element Transmission for Multi-Frame Relaying

In some implementations, a base station can be configured to have the option of selecting a multi-frame relaying (MFR) method. In a multi-frame relaying (MFR) method DL and UL transmissions between a BS and its subordinate relay and subscriber stations can occur using two or more frames. Relay stations in a network path can receive PDUs from their parent BS or RS and forward the PDU to their child RSs or subscriber stations using a subsequent frame or sequence of frames. FIGS. 10A and 10B display exemplary frame structures for an MFR method. FIG. 10C shows the reuse of time slots within an MFR method due to the spatial distribution of RS1 and RS3.

Using an MFR method source-to-sink PDU transmission time is more compared to a single-frame relay (SFR) method but typically requires less complex hardware. A key benefit of a MFR method is that relay stations have more time to process PDUs that they receive. Signal processing can therefore be implemented in less-costly software rather than hardware. A reduction in relay station size, weight and power is more easily attainable if signal processing is implemented in software rather than dedicated hardware. Due to the added time for PDU processing, an MFR method also facilitates the implementation of more complex Decode-and-Reencode relay stations as defined above.

Mth Frame Transmission

FIG. 11 shows a flowchart of the method for dynamic frame element allocation and reuse. FIGS. 10A and 10B display exemplary frame structures for an MFR method. FIG. 10C shows the reuse of time slots within an MFR method due to the spatial distribution of RS1 and RS3. Referring to FIG. 10A, FIG. 10C and to the flowchart in FIG. 11, the steps for allocation of m th frame elements for an MFR method are described below. In this example, the steps 192, 194, 196, 198, 200, 202, 204, 206, 208, and 210 are configured to perform the same operations in steps 92, 94, 96, 98, 100, 102, 104, 106, 108 and 110 in FIG. 8, respectively.

In steps 212 and 214 the one-hop subscriber stations (SS1, SS2, SS3, SS6) of the base station BS construct and transmit the BS UL Zone of the UL subframe. The BS UL Zone is comprised of data bursts that are to be transmitted to the BS from its one-hop subscriber stations (SS1, SS2, SS3, SS6). Burst allocations for the BS UL Zone can be specified using information elements within the BS Uplink Map (UL-MAP).

The BS UL ranging subchannel is used by the base station's one-hop subscriber stations (SS1, SS2, SS3, SS6) to perform closed-loop time, frequency, and power adjustment as well as bandwidth requests.

The BS UL CQICH (channel quality indicator channel) is used by the base station's one-hop subscriber stations (SS1, SS2, SS3, SS6) to feedback channel-state information to the BS. Specifically the link quality estimates BS-SS1, BS-SS2, BS-SS3, and BS-SS6 as defined in row one of the link rank matrix of FIG. 4A. The base station uses these estimates to update the link rank matrix R shown in FIG. 4A.

The BS UL ACK is used by the base station's one-hop subscriber stations (SS1, SS2, SS3, SS6) to feedback DL Hybrid-ARQ acknowledgements to the BS.

(M+1)th Frame Transmission

Referring to FIG. 10B, FIG. 10C and to the flowchart in FIG. 11, the steps for allocation of (m+1)th frame elements for an MFR method are described below.

In steps 216 relay stations RS1 and RS3 concurrently construct and transmit the RS1 Preamble and the RS3 Preamble of the DL subframe. The RS1 Preamble is a reference signal known by all network receivers. It is used by SS3 and SS4 for DL synchronization (frame timing acquisition, frequency offset estimation, symbol timing estimation) and channel estimation. SS3 and SS4 can use the RS1 Preamble to obtain link quality estimates RS1-SS3 and RS1-SS4 as defined in row two of the link rank matrix of FIG. 4A. The RS3 Preamble is a reference signal known by all network receivers. It is used by SS7 and SS8 for DL synchronization (frame timing acquisition, frequency offset estimation, symbol timing estimation) and channel estimation. SS7 and SS8 can use the RS3 Preamble to obtain link quality estimates RS3-SS7 and RS3-SS8 as defined in row four of the link rank matrix of FIG. 4A. These link quality estimates can be returned to the base station in the UL frame so the base station can update R.

In steps 218 and 220 relay stations RS1 and RS3 construct the RS1 DL Zone and the RS3 DL Zone of the DL subframe. Because of the spatial distribution of RS1 and RS3 downlink zones for RS1 and RS3 are transmitted concurrently using the same frame elements (see FIG. 10C for clarification). The RS1 DL Zone is comprised of an FCH, DL-MAP, UL-MAP and DL bursts that are to be transmitted by RS1 to its one-hop subscriber stations (SS3, SS4). The RS3 DL Zone is comprised of an FCH, DL-MAP, UL-MAP and DL bursts that are to be transmitted by RS3 to its one-hop subscriber stations (SS7, SS8). For clarity these fields are not shown within FIG. 10B. If shown they would have a similar structure to that shown for the RS2 DL Zone of FIG. 10A. The DL and UL burst allocations for the RS1 DL and UL Zones are specified by RS1 using information elements (IEs) that are within the RS1 Downlink Map (DL-MAP) and RS1 Uplink Map (UL-MAP). The DL and UL burst allocations for the RS3 DL and UL Zones are specified by RS3 using information elements (IEs) that are within the RS3 Downlink Map (DL-MAP) and RS3 Uplink Map (UL-MAP). RS1's one-hop neighbors (SS3, SS4) receive the RS1 DL Zone and prepare to receive DL data and transmit UL data based on frame element usage commands within their sections of the DL-MAP and UL-MAP. RS3's one-hop neighbors (SS7, SS8) receive the RS3 DL Zone and prepare to receive DL data and transmit UL data based on frame element usage commands within their sections of the DL-MAP and UL-MAP. The RS1 and RS3 MAPs were originally derived by the BS according to step 198 so RS1 and RS3 serve as a MAP forwarding nodes for the BS.

In steps 222 and 224 the one-hop subscriber stations (SS3, SS4) of relay station RS1 and the one-hop subscriber stations (SS7, SS8) of RS3 concurrently construct the RS1 UL Zone and the RS3 UL Zone of the UL subframe. The RS1 UL Zone is comprised of data bursts that are to be transmitted from one-hop subscriber stations (SS3, SS4) to RS1. The RS3 UL Zone is comprised of data bursts that are to be transmitted from one-hop subscriber stations (SS7, SS8) to RS3. Because of the spatial distribution of RS1 and RS3 uplink zones for RS1 and RS3 are transmitted concurrently using the same frame elements (see FIG. 10C for clarification). Burst allocations for the RS1 and RS3 UL Zones are specified using information elements within the RS1 Uplink Map (UL-MAP) and the RS3 Uplink Map (UL-MAP) received in step 218. Information for RS1's UL-MAP are obtained from the base station via a one-hop DL burst from the BS to RS1. Information for RS3's UL-MAP are obtained from the base station via a two-hop DL burst from the BS to RS2 to RS3.

The Uplink zones for RS1 and RS3 also include an RS1 UL Ranging Subchannel, an RS3 UL Ranging Subchannel, an RS1 UL CQICH (channel quality indicator channel), an RS3 UL CQICH, an RS1 UL ACK subchannel, and an RS3 UL ACK subchannel. For clarity these fields are not shown within FIG. 10B. If shown they would have a similar structure to that shown in the RS2 UL Zone.

The RS1 UL ranging subchannel is used by RS1's one-hop subscriber stations (SS3, SS4) to perform closed-loop time, frequency, and power adjustment as well as bandwidth requests. The RS3 UL ranging subchannel is used by RS3's one-hop subscriber stations (SS7, SS8) to perform closed-loop time, frequency, and power adjustment as well as bandwidth requests.

The RS1 UL CQICH (channel quality indicator channel) is used by RS1's one-hop subscriber stations (SS3, SS4) to feedback channel-state information to RS1. Specifically the link quality estimates RS1-SS3 and RS1-SS4 as defined in row two of the link rank matrix of FIG. 4A. The base station can use these estimates to update the link rank matrix R shown in FIG. 4A.

The RS3 UL CQICH (channel quality indicator channel) is used by RS3's one-hop subscriber stations (SS7, SS8) to feedback channel-state information to RS3. Specifically the link quality estimates RS3-SS7 and RS3-SS8 as defined in row four of the link rank matrix of FIG. 4A. The base station can use these estimates to update the link rank matrix R shown in FIG. 4A.

The RS1 UL ACK is used by RS1's one-hop subscriber stations (SS3, SS4) to feedback DL Hybrid-ARQ acknowledgements to RS1. The RS3 UL ACK is used by RS3's one-hop subscriber stations (SS7, SS8) to feedback DL Hybrid-ARQ acknowledgements to RS3.

In steps 226 and 228 the one-hop relay station (RS3) and the one-hop subscriber stations (SS5, SS6, SS8) of relay station RS2 construct and transmit the RS2 UL Zone of the UL subframe. The RS2 UL Zone is comprised of data bursts that are to be transmitted to RS2 from its one-hop relay station RS3 and its one-hop subscriber stations (SS5, SS6, SS8). Burst allocations for the RS2 UL zone are specified using information elements within the RS2 Uplink Map (UL-MAP) field.

The RS2 UL ranging subchannel is used by RS2's one-hop relay station (RS3) and its one-hop subscriber stations (SS5, SS6, SS8) to perform closed-loop time, frequency, and power adjustment as well as bandwidth requests.

The RS2 UL CQICH (channel quality indicator channel) is used by RS2's one-hop relay station (RS3) and its one-hop subscriber stations (SS5, SS6, SS8) to feedback channel-state information to RS1. Specifically the link quality estimates RS2-RS3, RS2-SS5, RS2-SS6 and RS2-SS8 as defined in row three of the link rank matrix of FIG. 4A. The base station uses these estimates to update the link rank matrix R shown in FIG. 4A.

The RS2 UL ACK is used by RS2's one-hop relay station (RS3) and its one-hop subscriber stations (SS5, SS6, SS8) to feedback DL Hybrid-ARQ acknowledgements to RS2.

In steps 230 and 232 the one-hop relay stations (RS1, RS2) of the base station BS construct and transmit the BS UL Zone of the UL subframe. The BS UL Zone is comprised of data bursts that are to be transmitted to the BS from its one-hop relay stations (RS1, RS2). Burst allocations for the BS UL Zone can be specified using information elements within the BS Uplink Map (UL-MAP).

The BS UL ranging subchannel is used by the base station's one-hop relay stations (RS1, RS2) to perform closed-loop time, frequency, and power adjustment as well as bandwidth requests.

The BS UL CQICH (channel quality indicator channel) is used by the base station's one-hop relay stations (RS1, RS2) to feedback channel-state information to the BS. Specifically the link quality estimates BS-RS1 and BS-RS2 as defined in row one of the link rank matrix of FIG. 4A. The base station uses these estimates to update the link rank matrix R shown in FIG. 4A.

The BS UL ACK is used by the base station's one-hop relay stations (RS1, RS2) to feedback DL Hybrid-ARQ acknowledgements to the BS.

Hence, one method for frame element allocation and reuse within a wireless cellular network equipped with base stations, subscriber stations and relay stations for multi-hop protocol data unit (PDU) relaying can include the following. A base station (BS) is operated to obtain PDUs that are to be transmitted to subscriber stations (SSs) within its service network and to group the PDUs based on their destination SSs; the BS ranking network links in terms of a link quality metric. The BS is also operated to rank all candidate BS-to-SS network paths based on the link quality metrics. The BS is operated to select the optimal BS-to-SS network paths from the candidates. The BS is also operated to optimally allocate or apportion frame elements (slots, bursts, zones, subchannels, subchannel groups, and segments) that are to be used by the relay and subscriber stations within the selected BS-to-SS network paths. In this method, the base station is operated to construct and transmit DL and UL MAPs specifying the frame element allocation to be used by stations within selected BS-to-SS network paths.

Based on the above described features and examples, one or more of the following implementations may be used in various applications. In one implementation, a base station link-quality matrix can be provided where each element in the link-quality matrix corresponds to a network link and quantifies the quality of a link connecting two BS, RS or SS network nodes. Values of zero within the link rank matrix indicate that no link exists between a network node pair; non-zero link ranks may be any radio resource measurement value or combination that indicates the quality of a network link.

In another implementation, matrix elements of the link rank matrix are updated from local link quality values or estimates performed by RSs and SSs and returned to the base station by single or multi-hop UL paths (channel quality indicator channels) to the BS.

In another implementation, DL Preambles or reference signals known by all receivers within the exemplary network are used by relay stations and subscriber stations for DL synchronization (frame timing acquisition, frequency offset estimation, symbol timing estimation) and link or channel quality estimation.

In another implementation, an appropriate link and path ranking algorithm based on values within the link rank matrix can be used in the described techniques.

In yet another implementation, an m-hop link connectivity matrix can be used for the base station's service network. Elements within the link connectivity matrix quantify the number of hops of m or less for all service network nodes.

In yet another implementation, matrix elements of the link rank matrix can be used to compute the m-hop link connectivity matrix without relying on other values.

In yet another implementation, a base station can be pre-configured with the m-hop link connectivity matrix. For example, if all network relay and subscriber stations are fixed in location the base station could be pre-configured with a fixed m-hop link connectivity matrix.

In yet another implementation, a base station can be operated to acquire and update the m-hop link connectivity matrix. For example, if the network contains mobile and/or nomadic relay and subscriber stations, nodes and link connectivity can change.

In yet another implementation, a described techniques can select single- or multi-frame allocation of frame elements. In a single-frame allocation DL and UL transmissions between a BS and its subordinate relay and subscriber stations can occur using a single frame. In a multi-frame allocation DL and UL transmissions between a BS and its subordinate relay and subscriber stations can occur using two or more frames.

In yet another implementation, the base station frame element allocation can be made based on one or more factors: (1) link quality as indicated by elements of the link rank matrix, (2) the size of a PDU to be transmitted, and (3) the type of PDUs that an RS can support and forward to other base, subscriber and relay stations within its coverage area.

In yet another implementation, a base station can be operated to optimally allocate frame elements based on the location and spatial distribution of the base station and relay and subscriber stations.

In yet another implementation, a base station can be operated to concurrently use or reuse frame elements whenever the spatial distribution of communicating network stations is such that their co-channel interference to each other is below certain reasonable levels.

In yet another implementation, a network can be configured to include mobile and/or nomadic relay and subscriber stations and the m-hop connectivity matrix is acquired and updated at different time intervals.

In yet another implementation, the path diversity may be implemented by receiving relay and subscriber stations when duplicated frame elements are allocated for independent paths to an SS or RS.

While this specification contains many specifics, these should not be construed as limitations on the scope of an invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

Only a few implementations are disclosed. However, it is understood that variations and enhancements may be made.

What is claimed is:

1. A method for managing radio resources in a wireless cellular network with relay stations, comprising:
    operating a base station to provide a base station link-quality matrix to indicate quality of a link between the base station to at least one or more relay stations subordinate to the base station, and one or more subscriber stations, where each element in the link-quality matrix corresponds to a network link and quantifies a quality of a link connecting to at least one or more relay stations subordinate to the base station, and one or more subscriber stations; and
    operating the base station to allocate frame elements in signal transmission based on the quality of a link between the base station to the at least one or more relay stations subordinate to the base station and the one or more subscriber stations;
    wherein the frame elements in signal transmissions are allocated to achieve concurrent reuse based on locations and a spatial distribution of the base station, the at least one or more relay stations subordinate to the base station and the one or more subscriber stations.

2. The method as in claim 1, comprising:
    pre-configuring the base station to have the base station link-quality matrix based on predetermined quality of links between the base station to the at least one or more relay stations subordinate to the base station and the one or more subscriber stations.

3. The method as in claim 2, comprising:
    operating the base station to acquire network link information on links between the base station to the at least one or more relay stations subordinate to the base station and the one or more subscriber stations; and
    using the acquired network link information to update the base station link-quality matrix.

4. The method as in claim 3, wherein the acquired network link information to update the base station link-quality matrix is obtained from the at least one or more relay stations subordinate to the base station and the one or more subscriber stations.

5. The method as in claim 1, comprising:
    operating the base station to acquire network link information on links between the base station to the at least one or more relay stations subordinate to the base station and the one or more subscriber stations; and
    using the acquired network link information to construct the base station link-quality matrix.

6. The method as in claim 5, comprising:
    operating the base station to continue acquiring the network link information; and
    using the acquired network link information to update the base station link-quality matrix.

7. The method as in claim 6, wherein the acquired network link information to update the base station link-quality matrix is obtained from the at least one or more relay stations subordinate to the base station and the one or more subscriber stations.

8. The method as in claim 1, wherein:
    the frame elements in signal transmission are allocated based on at least one of (1) link quality, (2) a size of a protocol data unit (PDU) to be transmitted, and (3) a type of PDUs that a relay station subordinate to the base station supports.

9. The method as in claim 1, wherein the signal transmission is a single frame transmission.

10. The method as in claim 1, wherein the signal transmission is a multi-frame transmission.

11. The method as in claim 1, comprising,
    using spatially distributed relay stations subordinate to the base station to cooperate with one another to provide spatial diversity.

12. a wireless cellular network with relay stations, comprising:
    a plurality of base stations forming a base station network to provide wireless radio access for subscriber stations for wireless communications;
    a plurality of relay stations, each relay station being in wireless communication with at least one of the base stations and another relay station to extend a wireless coverage of the base station network, each relay station establishing a link connection to a superordinate station, which is either a different relay station or a base station, to be connected to the base station network; and
    a radio resource management mechanism that operates each base station to provide a base station link-quality matrix to indicate quality of a link between the base station to at least one or more relay stations subordinate to the base station, and one or more subscriber stations, where each element in the link-quality matrix corresponds to a network link and quantifies a quality of a link connecting to at least one or more relay stations subordinate to the base station, and one or more subscriber stations wherein the radio resource management mechanism operates the base station to allocate frame elements in signal transmission based on the quality of a link between the base station to the at least one or more relay stations subordinate to the base station and the one or more subscriber stations;
    wherein the frame elements in signal transmissions are allocated to achieve concurrent reuse based on locations and a spatial distribution of the base station, the at least one or more relay stations subordinate to the base station and the one or more subscriber stations.

13. The network as in claim 12, wherein:
    the frame elements in signal transmission are allocated based on at least one of (1) link quality, (2) a size of a protocol data unit (PDU) to be transmitted, and (3) a type of PDUs that a relay station subordinate to the base station supports.

14. The network as in claim 12, wherein the signal transmission is a single frame transmission.

15. The network as in claim 12, wherein the signal transmission is a multi-frame transmission.

16. The network as in claim 12, wherein the radio resource management mechanism operates to use spatially distributed relay stations subordinate to the base station to cooperate with one another to provide spatial diversity.

* * * * *